United States Patent
Salerno et al.

(10) Patent No.: US 12,365,281 B2
(45) Date of Patent: Jul. 22, 2025

(54) MODULAR KITCHEN MOUNTING APPARATUS

(71) Applicant: Rivian IP Holdings, LLC, Irvine, CA (US)

(72) Inventors: Jonathan David Salerno, Newport Beach, CA (US); Stephen Gillette, Worthing (GB); Daniel Geoffrey Walker, Northants (GB)

(73) Assignee: Rivian IP Holdings, LLC, Irvine, CA (US)

( * ) Notice: Subject to any disclaimer, the term of this patent is extended or adjusted under 35 U.S.C. 154(b) by 580 days.

(21) Appl. No.: 17/866,963

(22) Filed: Jul. 18, 2022

(65) Prior Publication Data
US 2023/0256889 A1 Aug. 17, 2023

Related U.S. Application Data

(60) Provisional application No. 63/310,222, filed on Feb. 15, 2022.

(51) Int. Cl.
*B60R 5/04* (2006.01)
*B60P 3/36* (2006.01)
*B60P 7/08* (2006.01)

(52) U.S. Cl.
CPC .................................. *B60P 3/36* (2013.01)

(58) Field of Classification Search
CPC .... B60R 5/041; B60R 2011/0042; B60P 3/36; B60P 3/32; B60P 7/08
USPC ....... 296/37.16, 37.6, 24.34, 65.01; 224/403, 224/404, 511, 539, 544, 42.32; 410/91, 410/77, 80, 90; 312/351.7
See application file for complete search history.

(56) References Cited

U.S. PATENT DOCUMENTS

| | | | |
|---|---|---|---|
| 6,375,054 B1 * | 4/2002 | Lance | B60P 3/14 224/547 |
| 8,083,113 B2 * | 12/2011 | Klosk | B60R 7/02 224/547 |
| 11,584,310 B2 * | 2/2023 | Cooper | B60P 3/34 |

(Continued)

FOREIGN PATENT DOCUMENTS

KR 20100007268 * 7/2010

OTHER PUBLICATIONS

U.S. Appl. No. 17/866,968, filed Jul. 18, 2022, Jonathan David Salerno.

*Primary Examiner* — Joseph D. Pape
(74) *Attorney, Agent, or Firm* — Haley Guiliano LLP

(57) ABSTRACT

Systems and methods are presented herein for a mounting apparatus configured to arrange a retractable kitchen within a vehicle enclosure. The mounting apparatus comprises a first slot configured to accommodate an alignment protrusion of a kitchen module. The mounting apparatus further comprises a second slot configured to accommodate a locking assembly, which, when actuated into a locking position prevents translation of the kitchen module along the second slot. The mounting apparatus shall be arranged on a bottom side of the vehicle enclosure and shall have a retractable kitchen module fixedly attached to the mounting apparatus. The retractable kitchen module comprises a kitchen module enclosure configured to move from a stored position to an extended positioned, and a kitchen work surface configured to extend away from the front side of the vehicle enclosure.

20 Claims, 16 Drawing Sheets

(56) References Cited

U.S. PATENT DOCUMENTS

2010/0320245 A1* 12/2010 Vilkomirski ............ B25H 3/02
                                                    224/404
2021/0235593 A1*  7/2021 Bousquet ............ H05K 7/1412

* cited by examiner

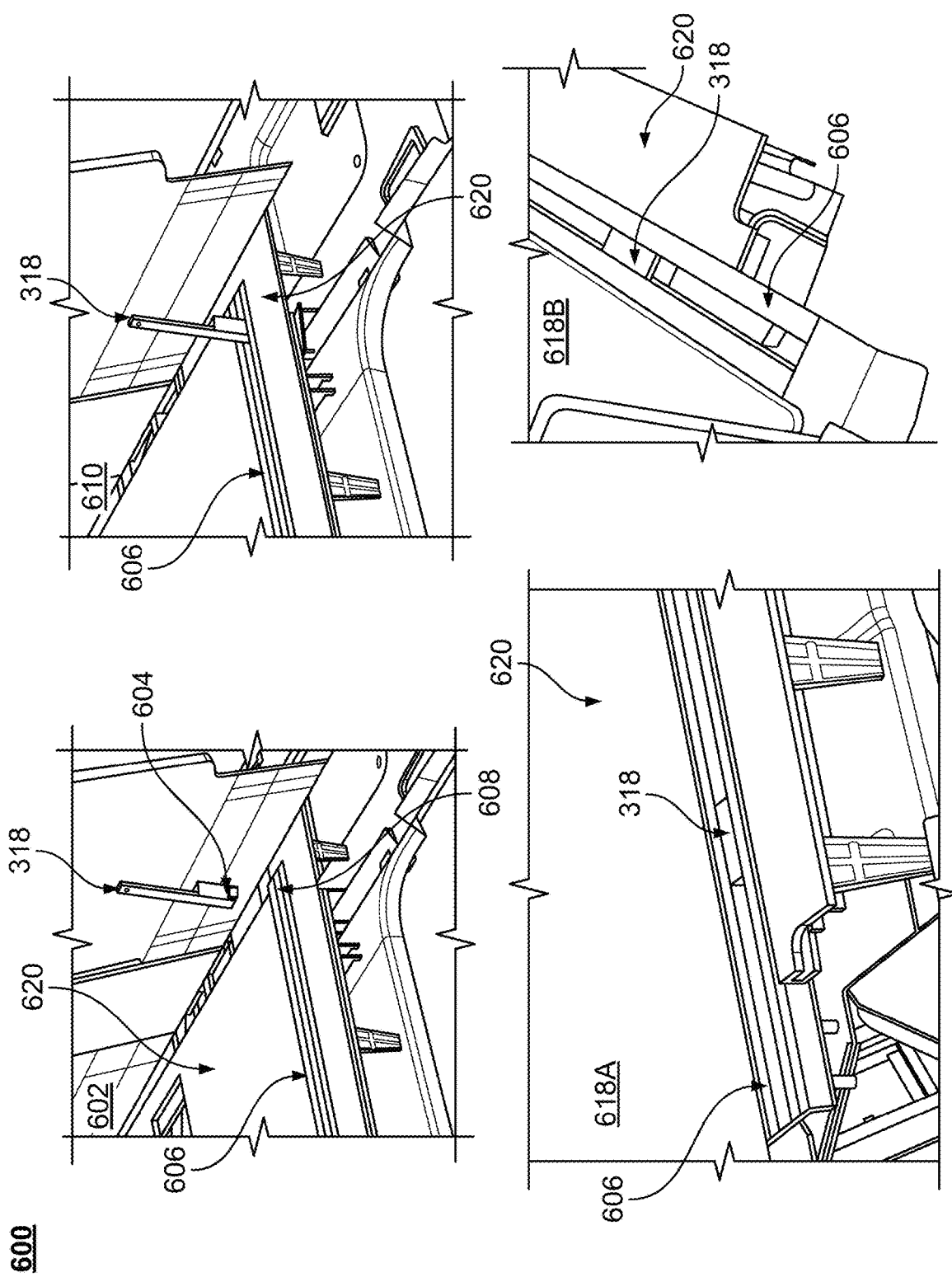

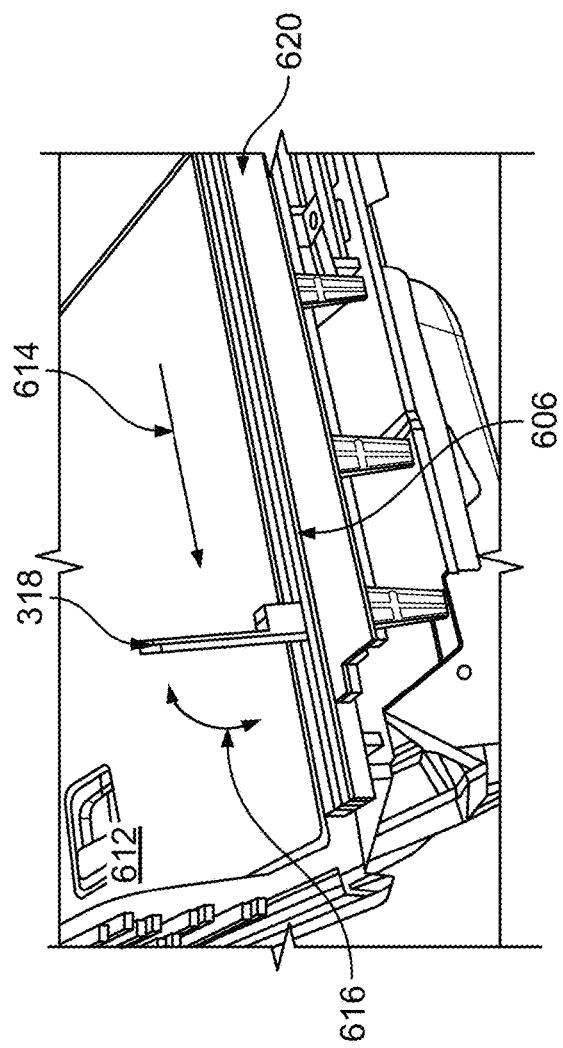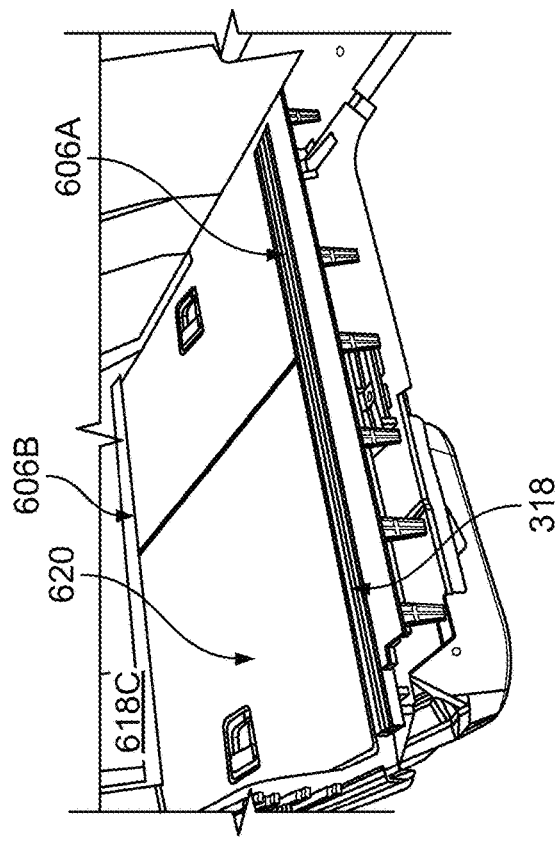
FIG. 6 (Cont.)

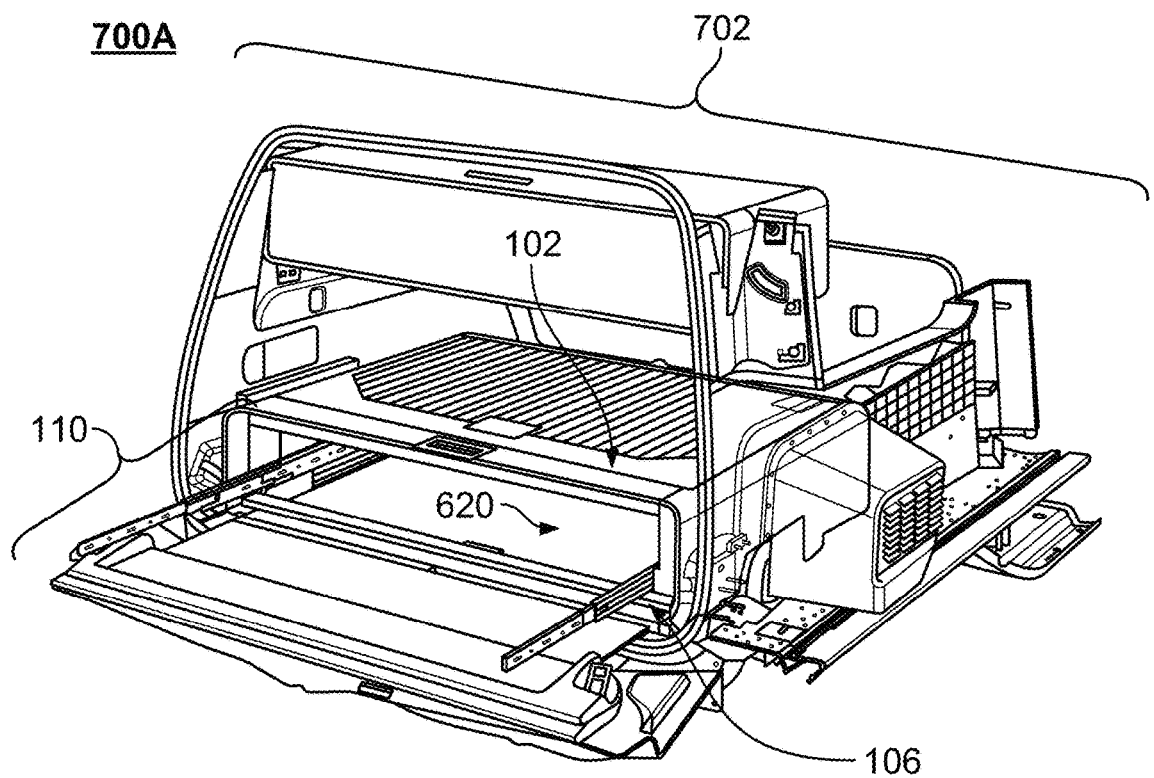
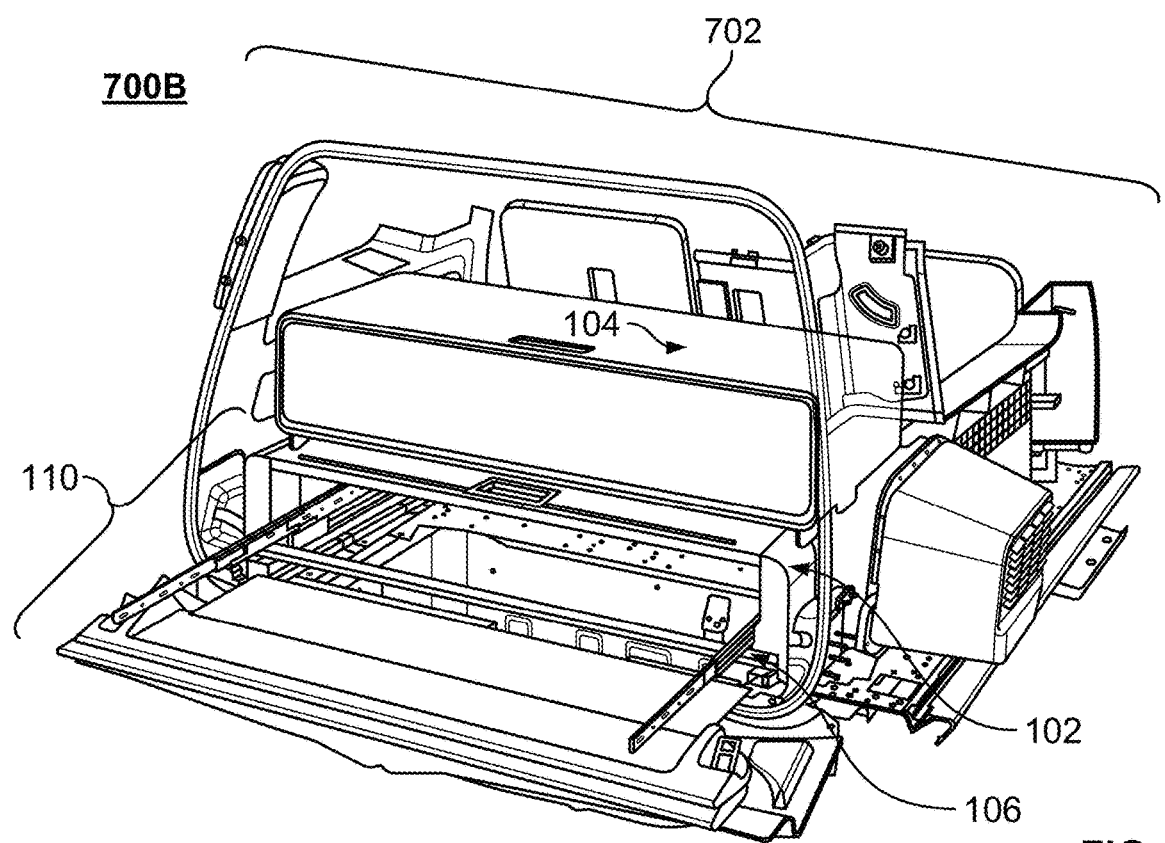
FIG. 7

MODULAR KITCHEN MOUNTING APPARATUS

CROSS-REFERENCE TO RELATED APPLICATIONS

This application claims the benefit of U.S. Provisional Patent Application No. 63/310,222 filed Feb. 15, 2022, the disclosure of which is hereby incorporated by reference herein in its entirety.

INTRODUCTION

The present disclosure is directed to systems and methods for a mounting apparatus configured to accommodate a modular kitchen, and more particularly, to systems and methods that provide a mounting apparatus configured to be secured in a vehicle enclosure or vehicle bay assembly such that the modular kitchen can be manipulated, translated, and articulated for use external to the vehicle enclosure.

SUMMARY

Vehicles used for off-road and sporting purposes may serve as transportation, provide shelter, and provide accessories for recreation. Some vehicles include storage such as truck beds, SUV cargo areas, or even rooftop storage systems. It would be advantageous for a vehicle to include integrated, compact accessories for travel. Additionally, a mounting apparatus, configured to accommodate these accessories, that can be manipulated and arranged based on a user's preferences and the dimensions of their vehicle enclosure, as compared to the amount of space required to store their accessories, would have utility for those using their vehicle for various applications.

Described herein is a mounting apparatus. The mounting apparatus comprises a release assembly arranged in a first slot, wherein the first slot comprises a conical pocket configured to receive the release assembly. The mounting apparatus also comprises a locking assembly comprising a handle. The locking assembly is configured to engage with a second slot and the locking assembly is configured to actuate into a locking position in response to rotation of the handle such that the locking position prevents translation of a storage apparatus along the second slot.

In some embodiments, the first slot is affixed to a mounting surface and the second slot is affixed to the mounting surface. Additionally, the storage apparatus is coupled to the locking assembly. In some embodiments, the release assembly configured to disengage the conical pocket in response to a motion event. The storage apparatus is arranged such that when the release assembly disengages from the conical pocket, a first end of the storage apparatus vertically translates while a second end of the storage apparatus remains fixedly attached to the second slot.

In some embodiments, the second slot comprises a t-slot. The second slot further comprises a geometry configured to accommodate a guiding protrusion of the storage apparatus.

In some embodiments, when the storage apparatus is aligned at a first position relative to the mounting apparatus, the storage apparatus can be translated in a first direction to separate the storage apparatus from the mounting apparatus and in a second perpendicular direction to cause the guiding protrusion to engage a geometry of the second slot.

In some embodiments, the mounting apparatus comprises a first rail structure that comprises the first slot and the second slot, and a second rail structure that comprises a third slot and a fourth slot, wherein the first rail structure and the second rail structure are each fixedly attached to the mounting surface. In some embodiments, the mount apparatus comprises a third slot, wherein the third slot comprises a respective conical pocket.

In some embodiments, the storage apparatus is configured to translate along the second slot in response to the handle being arranged perpendicular to a mounting surface configured to accommodate the second slot. Additionally, the storage apparatus is configured to remain stationary relative to the second slot in response to the handle being arranged parallel to the mounting surface in the locking position.

In some embodiments, the mounting apparatus comprises a fourth slot, wherein the fourth slot comprises a t-slot. In some embodiments, each of the second slot and a fourth slot comprises a respective t-slot configured to accommodate a respective guiding protrusion of the storage apparatus.

In some embodiments, the disclosure is directed to a vehicle bay assembly comprising a storage apparatus. The storage apparatus comprises first and second release assemblies, and first and second locking assemblies. The vehicle bay assembly also comprises a mounting apparatus fixedly attached to a mounting surface and configured to interface with the storage apparatus. The mounting apparatus comprises first and second conical pockets arranged within respective first and second slots. The first and second release assemblies are configured to disengage the first and second conical pockets, respectively, in response to a motion event, and the first and second locking assemblies are configured to engage with third and fourth slots, respectively, to prevent translation of the storage apparatus along the third and fourth slots.

In some embodiments, the storage apparatus is configured to be coupled to each of the first slot and the third slot when the storage apparatus is translated into an installation position along the mounting apparatus. In some embodiments, the first release assembly extends from a first alignment protrusion, wherein the first alignment protrusion extends from a bottom surface of the storage apparatus. Additionally, the second release assembly extends from a second alignment protrusion, wherein the second alignment protrusion extends from a bottom surface of the storage apparatus.

In some embodiments, the storage apparatus is arranged such that when each respective release assembly disengages from each respective conical pocket, a first portion of the storage apparatus vertically translates away from the mounting surface while a second portion of the storage apparatus remains fixedly attached to the mounting apparatus. In some embodiments, the storage apparatus comprises a frame configured to accommodate a pair of guidance tracks for translating a storage feature between a first locked position, a second position corresponding to a first extended length, and a third position corresponding to a second extended length that is longer than the first extended length.

In some embodiments, a portion of the mounting surface is configured to be fixedly attached to a top surface of the storage apparatus.

In some embodiments, the disclosure is directed to a vehicle, comprising a storage apparatus. The storage apparatus comprises a pair of alignment protrusions, each comprising a respective release assembly, and a pair of guiding protrusions. The vehicle also comprises a mounting apparatus coupled to a vehicle surface and configured to interface with the storage apparatus. The mounting apparatus comprises a first pair of slots, wherein each of the first pair of slots is configured to receive one of the pair of alignment protrusions and accommodate one of the respective release assemblies, and a second pair of slots. Each of the second pair of slots is configured to receive a respective locking assembly of the pair of guiding protrusions. Each locking assembly is configured to engage with each of the second pair of slots, respectively, to prevent translation of the storage apparatus along each of the second pair of slots in response to rotation of a handle coupled to at least one locking assembly.

In some embodiments, the mounting apparatus is coupled to a storage apparatus on a bottom surface of the storage apparatus, wherein the storage apparatus comprises a second surface arranged opposite of the bottom surface. Additionally, a second storage apparatus is releasably engaged with the second surface of the storage apparatus.

In some embodiments, the disclosure is directed to an apparatus comprising a storage apparatus comprising a kitchen enclosure configured to move from a stored position to a first extended position, wherein in the first extended position of the kitchen enclosure at least partially extends out from the storage apparatus. The apparatus also comprises a kitchen work surface configured to move from the stored position within the kitchen module enclosure to a second extended position. In some embodiments, the storage apparatus further comprises a top surface, wherein the top surface comprises a plurality of slots configured to receive a plurality of securing tabs.

In some embodiments, the apparatus comprises a second storage apparatus. The second storage apparatus is configured to be secured to a top surface of the storage apparatus by a plurality of securing tabs that extend from a bottom surface of the second storage apparatus.

In some embodiments, the second extended position the kitchen work surface is spaced away from the front side of the storage apparatus. The front side of the storage apparatus, and as otherwise referenced in this disclosure, corresponds to a direction which enables access to the internals of the storage apparatus (e.g., the front corresponds to the opening of the storage apparatus that enables a user to access the kitchen work surface, which may face or be oriented towards a front or rear vehicle bumper, depending on whether the apparatus is arranged within a front or rear vehicle bay).

In some embodiments, the kitchen work surface comprises at least one kitchen appliance comprising at least one of a water pump apparatus, a collapsible sink, a foldable feature, and a concealable stove top.

In some embodiments, a foldable feature of the kitchen work surface comprises a leaf hinge articulation system to enable folding and unfolding of the kitchen work surface. The foldable feature of the kitchen work surface comprises at least one of a concealable stove top and a collapsible sink. Additionally, or alternatively, the foldable feature of the kitchen work surface comprises at least one burner and at least one food preparation surface.

In some embodiments, the apparatus comprises a water pump apparatus comprising at least one of a water reservoir and a retractable hose.

In some embodiments, the storage apparatus is configured to accommodate a pair of guidance tracks for extending and retracting the kitchen enclosure. The kitchen enclosure is configured to extend to a first extended position based on a first length of a first portion of a pair of guidance tracks and is further configured enable extension of internal components to a second extended position, wherein the second extended position is longer than the first extended position to enable uninhibited access to the kitchen work surface. The second extended position enables a foldable feature of the kitchen work surface to extend beyond a front edge of a mounting surface to which the storage apparatus is affixed.

In some embodiments, the foldable feature of the kitchen work surface is arranged to achieve an unfolded configuration when translated to the second extended position.

In some embodiments, the apparatus is affixed to a surface of a rear vehicle bay assembly such that when the kitchen enclosure is extended to the first or second extended position the kitchen enclosure is positioned external to the rear vehicle bay assembly. In some embodiments, the apparatus further comprises a first slot configured to accommodate a first alignment protrusion of the storage apparatus, wherein the first slot comprises a first conical pocket configured to release a respective pin of a respective alignment protrusion. Additionally, the apparatus comprises a second slot configured to accommodate a first locking assembly configured to actuate into a locking position that prevents translation of the storage apparatus, wherein the storage apparatus is coupled to the locking assembly, along the second slot, a third slot configured to accommodate a second alignment protrusion of the storage apparatus, wherein the third slot comprises a second conical pocket configured to release a respective pin of a respective alignment protrusion, and a fourth slot configured to accommodate a second locking assembly configured to actuate into a locking position that prevents translation of the storage apparatus, wherein the storage apparatus is coupled to the second locking assembly, along the fourth slot.

In some embodiments, the storage apparatus further comprises a mounting apparatus comprising at least one alignment protrusion configured to interface with either the first slot or the third slot, at least one guiding protrusion configured to interface with either the second slot or the fourth slot.

In some embodiments, the disclosure is directed to a vehicle bay assembly, comprising a mounting apparatus fixedly attached relative to a mounting surface, and an apparatus configured to interface with the mounting apparatus. The apparatus comprises a storage apparatus comprising a kitchen enclosure configured to move from a stored position to a first extended position, wherein in the first extended position of the kitchen enclosure at least partially extends out from the storage apparatus, and a kitchen work surface configured to move from the stored position within the kitchen module enclosure to a second extended position.

In some embodiments, the kitchen enclosure further comprises a pair of guidance tracks for translating the kitchen enclosure. The kitchen enclosure is configured to translate to a first extended position based on a first length of a first portion of the pair of guidance tracks and is further configured translate to a second extended position, wherein the second extended position is longer than the first extended position to enable uninhibited access to the kitchen work surface.

In some embodiments, the disclosure is directed to a vehicle comprising a vehicle bay assembly comprising a mounting surface, and an apparatus configured to be secured to the mounting surface via a mounting apparatus. The apparatus comprises a front side comprising a releasing assembly, a kitchen enclosure comprising at least one kitchen appliance, wherein the kitchen module is configured to extend out from the storage apparatus into an extended position, wherein the extended position enable uninhibited access to the retractable kitchen module, and a bottom surface comprising a mounting apparatus configured to be secured to the mounting surface and released from the mounting surface based on a position of the storage apparatus relative to the mounting surface and an engagement status of the mounting apparatus.

BRIEF DESCRIPTIONS OF THE DRAWINGS

The present disclosure, in accordance with one or more various embodiments, is described in detail with reference to the following figures. The drawings are provided for purposes of illustration only and merely depict typical or example embodiments. These drawings are provided to facilitate an understanding of the concepts disclosed herein and shall not be considered limiting of the breadth, scope, or applicability of these concepts. It should be noted that for clarity and ease of illustration these drawings are not necessarily made to scale. The above and other objects and advantages of the disclosure may be apparent upon consideration of the following detailed description, taken in conjunction with the accompanying drawings, in which:

FIG. 6 illustrates an example of how an exemplary mounting apparatus feature may be installed in an exemplary mounting rail in a surface of a vehicle bay assembly, in accordance with some embodiments of the disclosure;

FIG. 7 depicts an exemplary storage apparatus arranged within a vehicle bay assembly and an exemplary second storage apparatus arranged on a top surface of the exemplary storage apparatus within the vehicle bay assembly, in accordance with some embodiments of the disclosure;

DETAILED DESCRIPTION

Figure 1:
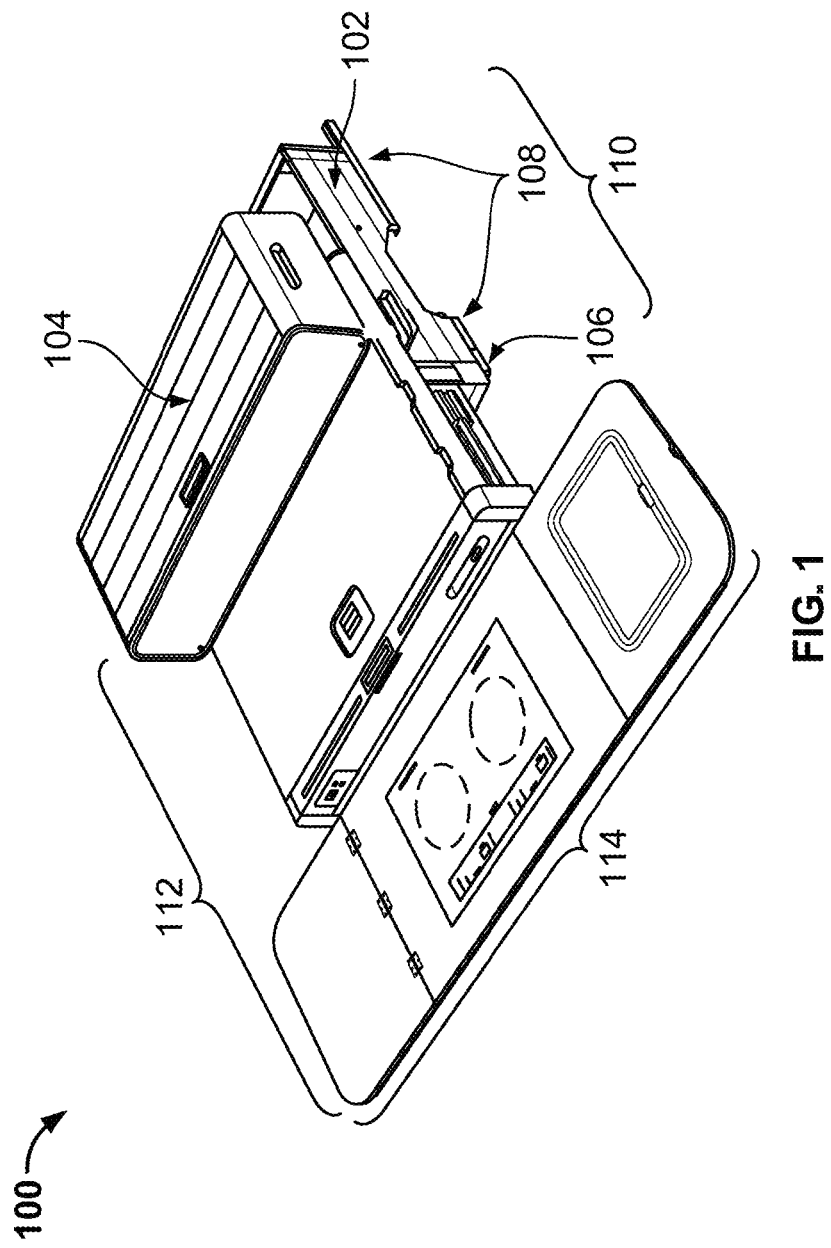
FIG. 1 depicts an exemplary modular kitchen assembly comprising a first and a second storage apparatus, in accordance with some embodiments of the disclosure.

FIG. 1 depicts modular kitchen assembly 100 comprising storage apparatus 102 and second storage apparatus 104, in accordance with some embodiments of the disclosure. Modular kitchen assembly 100 may comprise fewer than the depicted components or fewer than the components described in reference to modular kitchen assembly 100. Additionally, modular kitchen assembly 100 may comprise any or all of the components or features described in reference to or depicted in FIGS. 2-16.

Modular kitchen assembly 100 comprises storage apparatus 102 with second storage apparatus 104 arranged to interface with a top surface of storage apparatus 102. For example, second storage apparatus 104 may comprise a bottom surface with a plurality of securing tabs configured to interface with a plurality of slots in a top surface of storage apparatus 102, thereby securing second storage apparatus 104 to the top surface of storage apparatus 102. In some embodiments, a first plurality of securing tabs may be positioned towards a first lateral edge of second storage apparatus 104 and a second plurality of securing tabs may be positioned towards a second lateral edge of second storage apparatus 104. Additionally, a first plurality of slots may be positioned towards a first lateral edge of storage apparatus 102 that aligns with the first lateral edge of second storage apparatus 104 and a second plurality of slots may be positioned towards a second lateral edge of second storage apparatus 104.

Storage apparatus 106 comprises front side 106. Front side 106 may comprise an opening and a latched door configured to rotate about a hinge arranged towards a bottom edge of front side 106. In some embodiments, front side 106 comprises an adjustment latch which, when actuated, enables the internal components of storage apparatus 102 to be viewed by opening the latched door and may further be configured to unlock components of kitchen enclosure 110 so the components comprising kitchen enclosure 110 to a first and second extended position. Kitchen enclosure 110 comprises a first portion of retractable kitchen module 112, which is shown in FIG. 1 in a second extended position such that kitchen enclosure 110 is extended out of storage apparatus 102 and kitchen work surface 114 is extend out of kitchen enclosure 102. The second extended position depicted in FIG. 1 is intended to enable access to kitchen work surface 114 on at least three sides of kitchen work surface 114 (e.g., access to either lateral end from a lateral or longitudinal direction, and access to a central portion without being obstructed from a component of a vehicle bay assembly such as an open door or hatch). For example, the first extended position enables access to kitchen enclosure 110, in which kitchen work surface 114 may be arranged in a folded position. The second extended position corresponds to the depicted fully extended position of kitchen work surface 114.

Kitchen work surface 114 and kitchen enclosure 110 are configured to accommodate various components utilized for kitchen applications. For example, kitchen enclosure 110 may be configured to accommodate a water pump apparatus and kitchen work surface 114 may comprise at least one kitchen appliance such as a collapsible sink and/or a stove top. In some embodiments, kitchen work surface 114 comprises two lateral ends which are configured to be articulated into a folded position on a central portion of kitchen work surface 114. For example, each of the two lateral ends may be affixed to the central portion by a leaf hinge assembly. Additionally, when in the folded position, kitchen work surface 114 may be configured to be retracted into kitchen enclosure 110, which is configured to be retracted into storage apparatus 102 without contacting or interfering with storage of a water pump apparatus configured to be stored in kitchen enclosure 110. For example, kitchen work surface 114 may comprise dimensions when in the folded position such that a folded embodiment of kitchen work surface 114 may freely move in and out of front side 106 while also leaving enough room in storage apparatus 102 to store a water pump apparatus. Second storage apparatus 104 may be sized to accommodate and store additional kitchen related equipment or other survival/camping gear (e.g., clothing, sleeping apparatuses, cleaning apparatuses).

Modular kitchen assembly 100 further comprises bottom side 108, which comprises components or elements configured to interface and/or secure a mounting apparatus to bottom side 108. Bottom side 108 may comprise at least one alignment protrusion configured to interface with a first slot, or a pair of alignment protrusions each arranged towards a lateral edge of bottom side 108 configured to interface with a first pair of slots. The first slot, or first pair of slots, may be in a mounting surface comprising a floor of a vehicle bay assembly and may be arranged in a portion or portions of a rail embedded in a floor of a vehicle bay assembly, or secured to the floor of the vehicle bay assembly. The first slot may comprise a spring catch configured to release a pin of the at least one alignment protrusion in response to a motion event (e.g., rapid deceleration along a forward facing axis). Bottom side 108 may further comprise at least one locking assembly, or a pair of locking assemblies each arranged towards a lateral edge of bottom 108, that, when actuated into a locking position, prevents translation of storage apparatus 102. The second slot, or second pair of slots, may be in a mounting surface comprising a floor of a vehicle bay assembly and may be arranged in a portion or portions of a rail embedded in a floor of a vehicle bay assembly, or secured to the floor of the vehicle bay assembly. Storage apparatus 102 is connectively coupled to the locking assembly, along the second slot, when a locking assembly is manipulated into a locked configuration. The locking assembly may comprise a pin arranged to vertically translate and become affixed to the locking assembly when a lever, corresponding to storage apparatus 102, is actuated.

Figure 2:
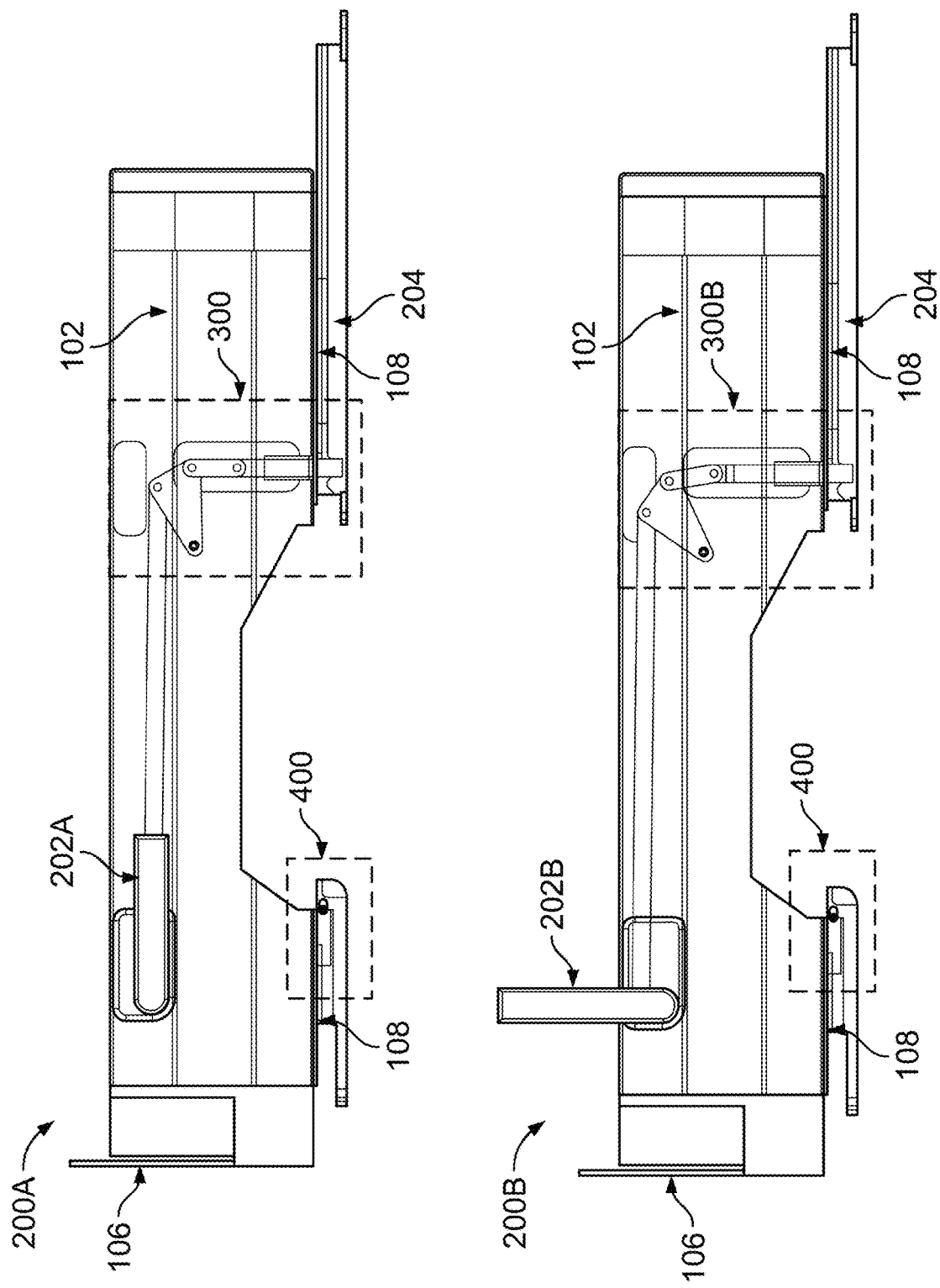
FIG. 2 depicts a storage apparatus with a locking assembly in a locked position and a second version of the storage apparatus with a locking assembly in an unlocked position, in accordance with some embodiments of the disclosure.

FIG. 2 depicts mounting apparatus locked configuration 200A wherein storage apparatus 102 comprises locking assembly 202A, with handle 206 arranged in a locked position parallel to a top surface of mounting apparatus locked configuration 200A, in accordance with some embodiments of the disclosure. FIG. 2 also depicts mounting apparatus movable configuration 200B wherein storage apparatus 102 comprises locking assembly 202B, with handle 206 arranged in an unlocked position perpendicular to the top surface of mounting apparatus movable configuration 200B, in accordance with some embodiments of the disclosure. Either mounting apparatus locked configuration 200A or mounting apparatus movable configuration 200B may comprise fewer than the depicted components or fewer than the components described in reference to ether mounting apparatus locked configuration 200A or mounting apparatus movable configuration 200B. Additionally, either mounting apparatus locked configuration 200A or mounting apparatus movable configuration 200B may comprise any or all of the components or features described in reference to or depicted in FIGS. 1 and 3-16.

Mounting apparatus locked configuration 200A comprises storage apparatus 102 with front side 106. In some embodiments, front side 106 comprises a latching assembly to enable a door corresponding to front side 106 to swing open about a hinged edge of front side 106. Additionally, the latching assembly may be mechanically coupled to components encased within storage apparatus 102 (e.g., kitchen enclosure 110 of FIG. 1) such that when the latching assembly of front side 106 is in a latched position, the internal components of storage apparatus 102 are locked in place. Alternatively, when the latching assembly of front side 106 is actuated to an unlatched configuration, the internal components may be configured to translate along tracks installed on the walls of storage apparatus 102 to enable the translation of the internal components (e.g., kitchen enclosure 110 of FIG. 1) to at least a first extended position to enable access to the internal components outside of storage apparatus 102.

Mounting apparatus locked configuration 200A further comprises bottom side 108 configured to incorporate one or more mounting features, such as at least one alignment protrusion and at least one guiding protrusion. Alignment protrusion assembly 400 comprises at least one alignment protrusion extending from bottom side 108 configured to interface with a spring catch positioned within a slot arranged to accommodate the alignment protrusion. In some embodiments, there is at least one of alignment protrusion assembly 400 arranged towards each lateral edge of bottom side 108 and towards front side 106. The at least one guiding protrusion corresponds to guiding protrusion 204 as shown in FIG. 2. In some embodiments, there is at least one of guiding protrusion 204 arranged towards each lateral edge of bottom side 108 and away from front side 106 towards a rear side of storage apparatus 102. In some embodiments, guiding protrusion 204 comprises a t-shaped extrusion or protrusion configured to engage with a portion of a mounting apparatus configured with a t-slot. Storage apparatus 102 is connectively coupled to locking assembly 300, when a locking assembly is manipulated into the locked configuration shown in mounting apparatus locked configuration 200A. The locking assembly may comprise a pin arranged to vertically translate and become affixed to the locking assembly when a lever, corresponding to storage apparatus 102, is actuated.

Mounting apparatus movable configuration 200B comprises storage apparatus 102 with front side 106 and bottom side 108 configured to incorporate one or more mounting features, such as at least one alignment protrusion and at least one guiding protrusion. Alignment protrusion assembly 400 comprises at least one alignment protrusion extending from bottom side 108 configured to interface with a spring catch positioned within a slot arranged to accommodate the alignment protrusion. The at least one guiding protrusion corresponds to guiding protrusion 204 as shown in FIG. 2. Storage apparatus 102 is disconnected from a mounting apparatus configured to receive guiding protrusion 204 when a locking assembly, corresponding to locking assembly 300, is manipulated into the unlocked configuration shown in mounting apparatus movable configuration 200B. The locking assembly may comprise a pin arranged to vertically translate and become disengaged from a rail structure (e.g., second rail structure 308 of FIG. 3, and a securing feature or tab in second slot 320 of FIG. 3) when a lever, corresponding to storage apparatus 102, is actuated to a disengaged position, thereby enabled storage apparatus 102 translate along the mounting apparatus and be vertically disengaged from a mounting surface corresponding to the mounting apparatus.

Figure 3:
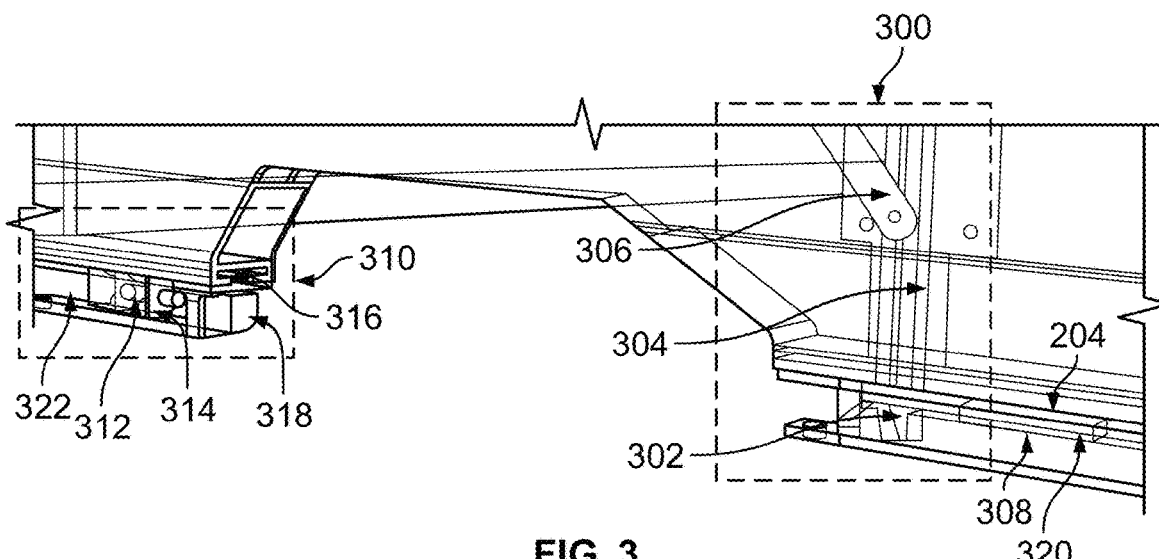
FIG. 3 depicts an exemplary guiding protrusion comprising a locking assembly of a locking assembly, in accordance with some embodiments of the disclosure.

FIG. 3 depicts locking assembly 300 interfaces with guiding protrusion 204 and comprises locking assembly 302 as well as alignment assembly 310, in accordance with some embodiments of the disclosure. Locking assembly 300 and alignment assembly 310 may comprise fewer than the depicted components or fewer than the components described in reference to locking assembly 300 or alignment assembly 310. Additionally, locking assembly 300 and/or alignment assembly 310 may comprise any or all of the components or features described in reference to or depicted in FIGS. 1, 2, and 4-16.

Locking assembly 300 is arranged to interface with second rail structure 308 and complements the function of guiding protrusion 204 which is accommodated by second slot 320. Second rail structure 308 is a portion of a mounting rail that comprises second slot 320 configured to received guiding protrusion 204. For example, if guiding protrusion 204 is a t-shaped protrusion, then second slot 320 comprises a t-slot. Additionally, second rail structure 308 is a portion of at least one of guiding rail arranged towards each lateral edge of bottom side 108 and away from front side 106 towards a rear side of storage apparatus 102 when storage apparatus 102 is arranged within a vehicle bay assembly. In some embodiment, second rail structure 308 may be embedded in a mounting surface of the vehicle bay assembly. Alternatively, second rail structure 308 may be affixed to the mounting surface of the vehicle bay assembly. Towards a front end of second rail structure 308 is a slot configured to accommodate locking pin 302. Locking pin 302 is a portion of locking body 304 that extends outside of storage apparatus 102 such that locking pin 302 sits within the slot in second rail structure 308 configured to accommodate locking pin 302 when locking body 304 is actuated by locking assembly arm 306. Locking assembly arm 306 may be coupled to a lever that is externally mounted to enclosure 102 such that a user can manipulate the lever from a locked position to unlocked position in order to vertically translate locking end into and out of the slot in second rail structure 308 by interfacing or engaging with a securing feature (e.g., a tab or extension) within the slot of second rail structure 308.

Alignment assembly 310 is arranged forward of locking assembly 300. Alignment assembly 310 comprises alignment protrusion 312, which is arranged to be accommodated by first rail structure 318. First rail structure 318 further comprises first slot 322, which is configured to receive alignment protrusion 318. In some embodiments, first rail structure 318 and rail structure 310 may comprise portions of a single continuous mounting rail. Alternatively, first rail structure 318 and rail structure 310 may comprise separate mounting rail assemblies as depicted in FIG. 3. Additionally, first rail structure 318 is a portion of at least one guiding rail arranged towards each lateral edge of bottom side 108 and towards front side 106 of storage apparatus 102 when storage apparatus 102 is arranged within a vehicle bay assembly. In some embodiment, first rail structure 318 may be embedded in a mounting surface of the vehicle bay assembly. Alternatively, first rail structure 318 may be affixed to the mounting surface of the vehicle bay assembly. Alignment protrusion 312 may comprise a top side feature configured to interface with enclosure bottom feature 316. For example, if enclosure bottom feature 316 comprises a t-slot, then the top side feature of the alignment protrusion 312 comprises a t-shaped protrusion. Arranged towards the rear face of alignment protrusion 312 is release assembly 314 (e.g., a release pin comprising a cylindrical extension and a concentric spring apparatus) configured to be compressed when alignment protrusion is translated along rail structure to a final installation position (e.g., when a modular kitchen mounting apparatus is placed in an installation position in a vehicle bay assembly).

Figure 4:
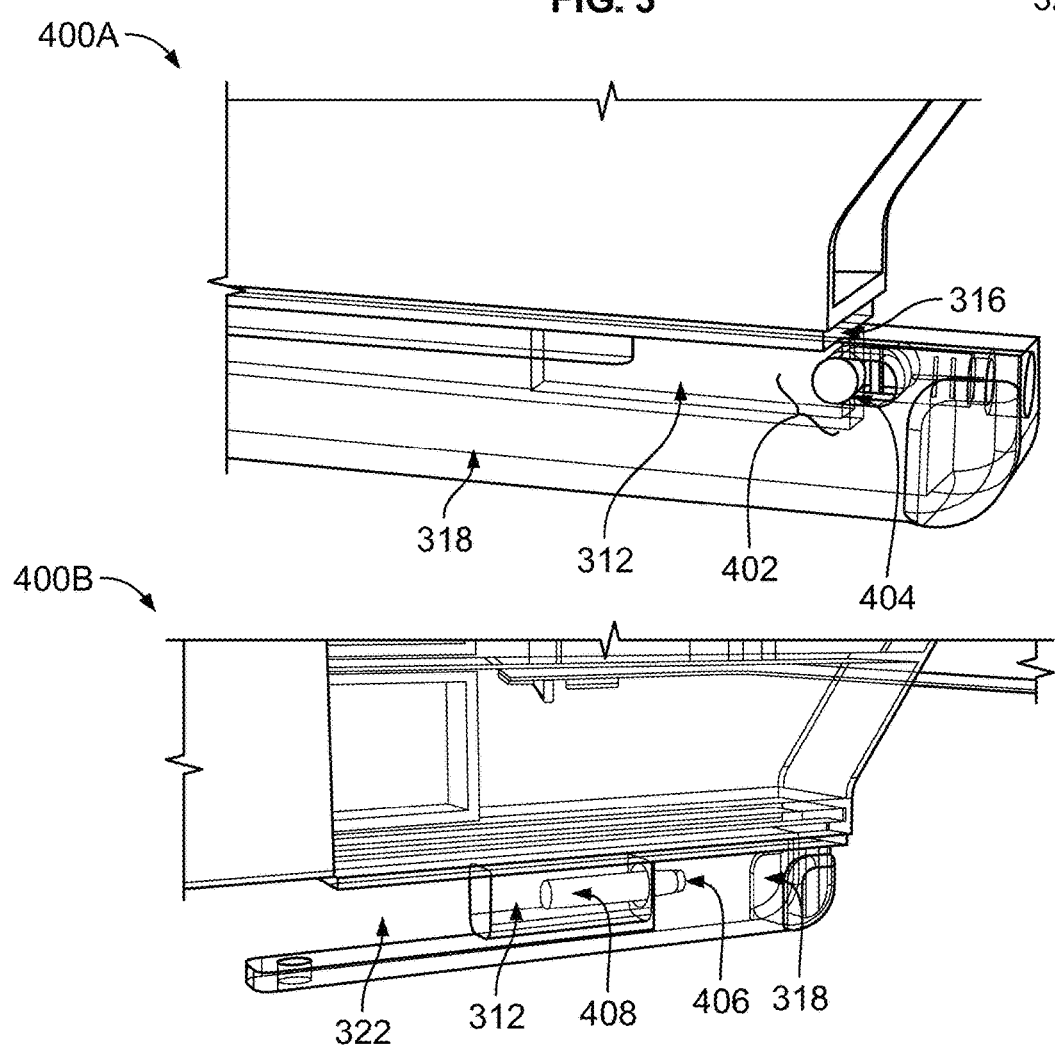
FIG. 4 depicts two exemplary alignment protrusions, in accordance with some embodiments of the disclosure.

FIG. 4 depicts alignment assembly 400A, comprising spring catch 404, and alignment assembly 400B, comprising release pin 408, in accordance with some embodiments of the disclosure. Alignment assemblies 400A and 400B may comprise fewer than the depicted components or fewer than the components described in reference to alignment assembly. Additionally, alignment assemblies 400A and 400B may comprise any or all of the components or features described in reference to or depicted in FIGS. 1-3 and 5-16.

Alignment assemblies 400A and 400B each correspond to alignment assembly 310 of FIG. 3. Alignment assemblies 400A and 400B comprises all of the components (described and depicted) in FIG. 3. Alignment assembly 400A further comprises release feature 402 (e.g., a semi-circular recess configured to receive a cylindrical profile of a securing feature such as a spring catch) and spring catch 404. Spring catch 404 is arranged within first rail structure 318 such that when alignment protrusion 312 reaches an installation position, as shown in FIG. 4, release feature 402 receives an outer surface of spring catch 404 and at least partially compresses spring catch 404 towards an end of first rail structure 318 (e.g., compressed to prevent vertical translation for minimal vertical forces and configured to enable vertical translation when fully compressed such that spring catch 404 releases alignment protrusion 312). For example, pin 404 interfaces with a slot arranged towards a lateral side of alignment protrusion 312. In some embodiments, spring catch 404 is configured to release or disengage release assembly 402 such that alignment protrusion 312 can vertically translate independently of first rail structure 318 (e.g., as shown in FIG. 5) in response to a motion event (e.g., a rapid change in acceleration such as a rapid deceleration towards the rear of the assembly).

Alignment assembly 400B further comprises release pin 408 (e.g., a predominantly cylindrical extension with a tapered or conical end configured to be inserted into a surface of protrusion 312 and extend away from the surface of protrusion 312 and conical pocket 406. Conical pocket 406 is arranged within first rail structure 318 such that when alignment protrusion 312 reaches an installation position, as shown in FIG. 4, release pin 408 resides within conical pocket 406 (e.g., against a surface of protrusion 312. In some embodiments, only the tapered or conical end of release pin 408 extends from protrusion 312 and resides within conical pocket 406. In some embodiments, a concentric spring may be used to enable the tapered or conical end of release pin 408 to be depressed axially towards the surface of protrusion 312. The tapered or conical end of release pin 408 is received by conical pocket 406 to prevent vertical translation for minimal vertical forces and configured to enable vertical translation when release pin 408 mechanically breaks or conical pocket 406 deforms in order to enable release pin 408 to translate independent of rail structure 318. For example, release pin 408 is configured to be release by, disengage, or break off into conical pocket 406 such that alignment protrusion 312 can vertically translate independently of first rail structure 318 (e.g., as shown in FIG. 5) in response to a motion event (e.g., a rapid change in acceleration such as a rapid deceleration towards the rear of the assembly). In one specific example, when the mounting apparatus is located in a rear cargo area of a vehicle and an object collides with the rear of the vehicle, the force of the collision may cause deformation which causes rail structure 318 to move away from release pin 408, thereby releasing release pin 408 from conical pocket 406.

Figure 5:
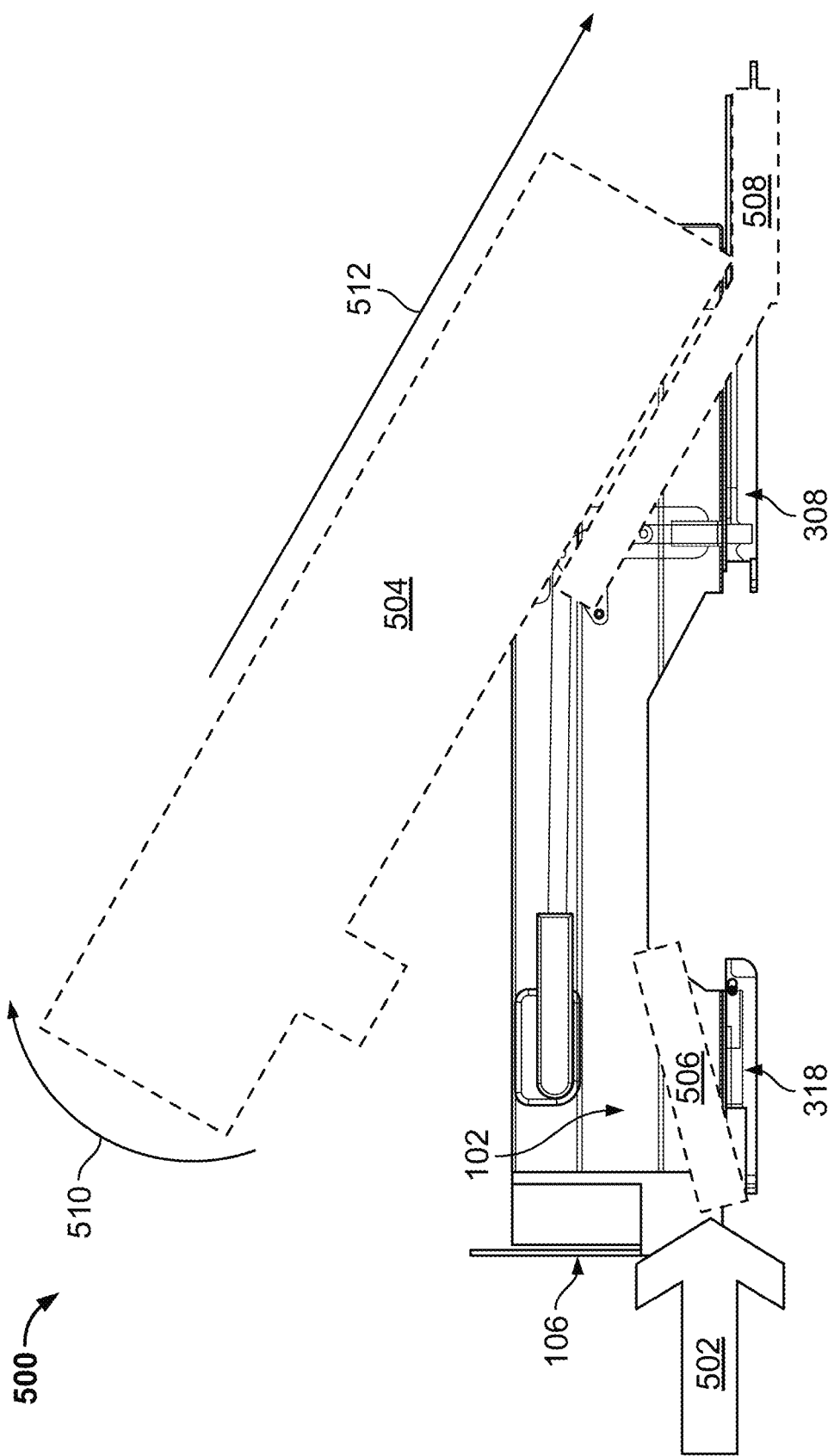
FIG. 5 illustrates an exemplary translation of a storage apparatus in response to a motion event, in accordance with some embodiments of the disclosure.

FIG. 5 illustrates motion event scenario 500 depicting the intended translation of storage apparatus 102 in response to motion input 502, in accordance with some embodiments of the disclosure. Motion event scenario 500 may incorporate fewer than the depicted components or fewer than the components described in reference to motion event scenario 500. Additionally, motion event scenario 500 may comprise any or all of the components or features described in reference to or depicted in FIGS. 1-4 and 6-16.

Storage apparatus 102 corresponds to storage apparatus 102 as shown in FIGS. 1 and 2, and comprises front side 106. Storage apparatus 102 is fixedly attached to a mounting surface (e.g., a surface of a floor of a vehicle bay assembly) by a mounting apparatus configured to interface with first rail structure 318 and second rail structure 308. First rail structure 318 may comprise any or all of the securing features shown in FIG. 4. Second rail structure 308 may comprise any or all of the securing features shown in locking assembly 300 of FIG. 3. Motion input 502 depicts a translation of a lateral change in acceleration (e.g., an impact to a portion of the vehicle bay assembly corresponding to front side 106) from a source object to at least a portion of front side 106. In response to receiving motion input 502 at a portion of front side 106 or any components connected to front side 106, first rail structure 318 deforms and becomes released rail structure 506. Released rail structure 506 may, for example, may comprise a spring catch configured to interface with a release assembly corresponding to an alignment protrusion as shown in FIGS. 3 and 4. Storage apparatus 102 is then free to translate along rotational trajectory 510 to result in released storage apparatus 504, wherein an alignment protrusion is no longer interfacing with released rail structure 506. Second rail structure 308 also deforms in response to motion input 502 and becomes deformed rail structure 508. Deformed rail structure 508 may comprise the locking components depicted in FIG. 3 and remains connect to a rear portion of released storage apparatus 504. As released storage apparatus 504 reaches a vertical apex of trajectory 510, released storage apparatus 504 is configured to translate along downward trajectory 512, so as to prevent an impact between released storage apparatus 504 and components arranged above trajectory 512 or to the right of trajectory 512.

FIG. 6 illustrates feature installation process 600, wherein first rail structure 318 is installed within mounting rail 606, in accordance with some embodiments of the disclosure. Feature installation process 600 may comprise fewer than the depicted components or fewer than the components described in reference to feature installation process 600. Additionally, feature installation process 600 may comprise any or all of the components or features described in reference to or depicted in FIGS. 1-5 and 7-16.

Installation step 602 comprises manipulating first rail structure 318 into a vertical orientation such that rail interface feature 604 aligns with rail opening 608 in mounting rail 606. For example, rail interface features 604 may comprise a round protrusion and rail opening 608 may comprise a round opening leading to a channel that extends a majority length of mounting rail 606 such that first rail structure 318 can be slid towards the front end of mounting rail 606 to a final installation position. Mounting rail 606 is fixedly attached to mounting surface 620. In some embodiments, mounting rail 606 may be embedded in mounting surface 620 such that a majority of mounting rail 606 does not protrude above mounting surface 620. In some embodiments, mounting rail 606 is at least partially elevated above mounting surface 620. At installation step 610, first rail structure 318 is inserted through rail opening 608 until an end of first rail structure 318 approaches a bottom surface of mounting rail 606. At installation step 612, first rail structure 318 is first translated along path 614 towards a front end of mounting rail 606 until first rail structure 318 reaches a final installation position. First rail structure 318 is then rotated along path 616 until a bottom surface of first rail structure 318 is parallel with a bottom of the opening of mounting rail 606.

View 618A show first rail structure 318 after installation step 612 in a final installation position in mounting rail 606. View 618B provides an alternative view of first rail structure 318 in a final installation position, such that the relative distance from the end of first rail structure 318 and the end of mounting rail 606 is visible. In some embodiments, first rail structure 318 comprises a spring catch. View 618C shows a complete view of mounting surface 620, which comprises mounting rail 606, which has first rail structure 318 in a final installation position, and also shows mounting rail 606B. In some embodiments, at least two mounting rails may be installed in mounting surface 620 to build up a stable foundation for a mounting apparatus. One or more fasteners may be used to secure first rail structure 318 to mounting surface 620. In some embodiments, first rail structure 318 and mounting surface 620 may comprise complementing features, tabs, and/or slots configured to prevent relative motion of first rail structure 318 when fixedly attached to mounting surface 620.

FIG. 7 depicts vehicle bay assembly 700A, comprising storage apparatus 102 arranged within vehicle bay 702, as well as vehicle bay assembly 700B, comprising second storage apparatus 104 arranged on a top surface of storage apparatus 102 within vehicle bay 702, in accordance with some embodiments of the disclosure. Vehicle bay assemblies 700A and 700B may comprise fewer than the depicted components or fewer than the components described in reference to vehicle bay assemblies 700A and 700B. Additionally, vehicle bay assemblies 700A and 700B may comprise any or all of the components or features described in reference to or depicted in FIGS. 1-6 and 8-16.

Vehicle bay assembly 700A comprises a plurality of components arranged within vehicle bay 702. Vehicle bay 702 comprises mounting surface 620, to which storage apparatus 102 is fixedly attached. In some embodiments, storage apparatus 102 is secured to mounting surface 620 by a mounting apparatus or mounting feature that is configured to interface with mounting surface 620 and storage apparatus 102. Storage apparatus 102 comprises front side 106. When front side 106 is open (e.g., a door on a hinge is opened), kitchen enclosure 110 may be extended beyond front side 106. In some embodiments, kitchen enclosure 110 may be extended to a first extended position, and may provide access to a kitchen work surface when extended to the second longer extended position.

Vehicle bay assembly 700B comprises a plurality of components arranged within vehicle bay 702, including all the components of vehicle bay assembly 700A, and further comprises second storage apparatus 104 fixedly attached to a top surface of storage apparatus 102. In some embodiments, securing tabs may extend from the bottom of second storage apparatus 104 and the top surface of storage apparatus 102 may comprises at least one slot for each securing tab that extends from the bottom of second storage apparatus 104.

Figure 8:
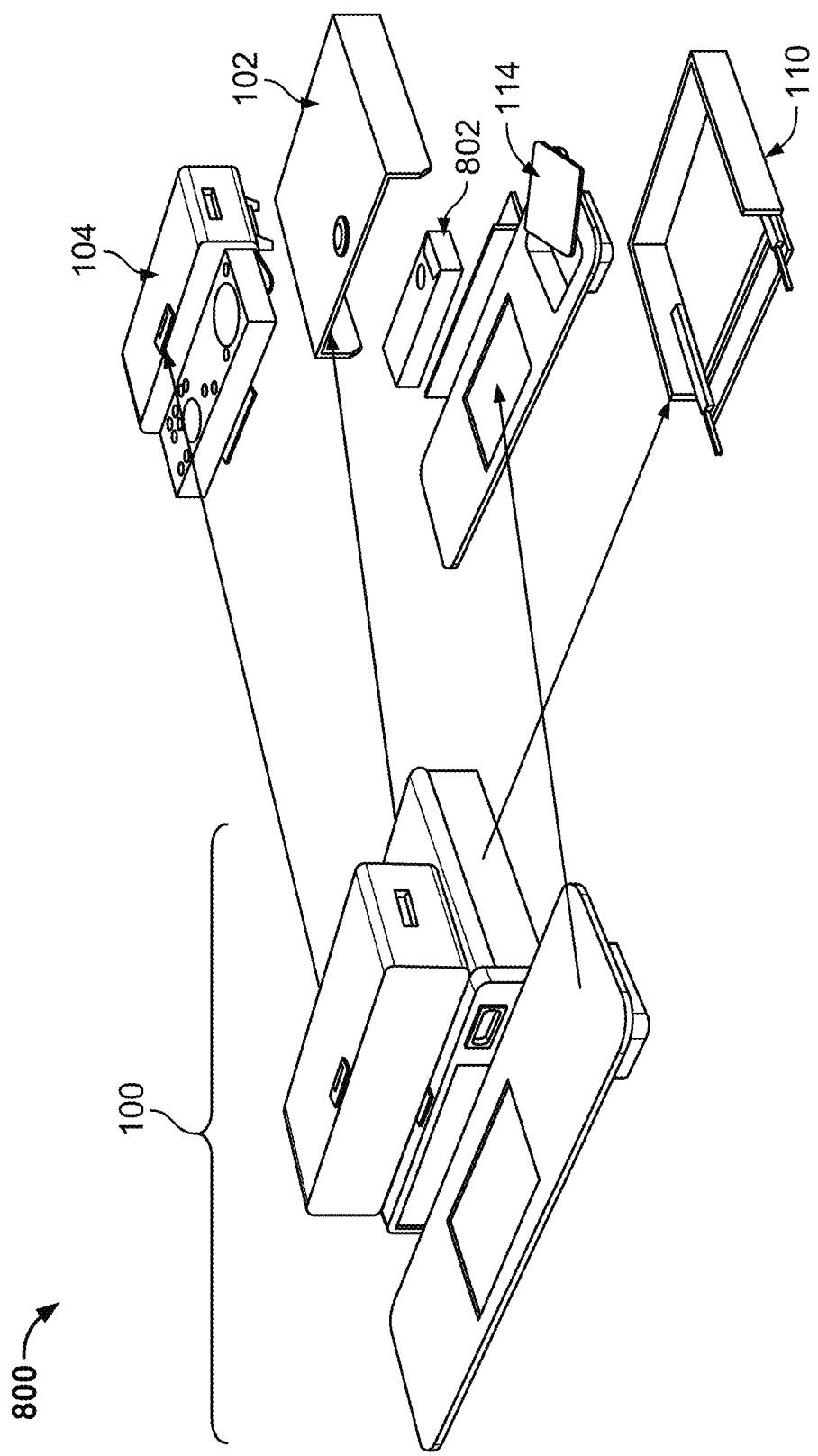
FIG. 8 depicts an exemplary assembled modular kitchen assembly and an exploded view of the modular kitchen assembly, in accordance with some embodiments of the disclosure.

FIG. 8 depicts assembled modular kitchen assembly 100 of FIG. 1 and exploded view 800 of modular kitchen assembly 100, in accordance with some embodiments of the disclosure. Modular kitchen assembly 100 may comprise fewer than the depicted components or fewer than the components described in reference to modular kitchen assembly 100. Additionally, modular kitchen assembly 100 may comprise any or all of the components or features described in reference to or depicted in FIGS. 1-7 and 9-16.

Modular kitchen assembly 100 comprises all of the components shown in FIG. 1, and when arranged in separate components, modular kitchen assembly 100 comprises all the components shown in exploded view 800. Storage apparatus 102 comprises a plurality of walls arranged to form a shell around kitchen enclosure 110. In some embodiments, the top surface of storage apparatus 102 comprises at least a portion of a removable surface extract from a mounting surface of a vehicle bay assembly. Kitchen enclosure 110 comprises a guide track apparatus arranged to enable kitchen work surface 114 to be extended in and out of kitchen enclosure 110. Additionally, storage apparatus 102 and kitchen enclosure 110 are configured to accommodate water pump apparatus 802 such that water pump apparatus 802 may be positioned within storage apparatus 102 while kitchen work surface 114 is folded and stored within the space created by storage apparatus 102 and kitchen enclosure 110. Arranged on top of storage apparatus 102 is second storage apparatus 104. Second storage apparatus 104 may be configured to store additional gear required for a trip, including additional kitchen utensils. In some embodiments, second storage apparatus 104 is fixedly attached to a top surface of storage apparatus 102 by a plurality of securing tabs configured to interface with a plurality of slots in the top surface of storage apparatus 102.

Figure 9:
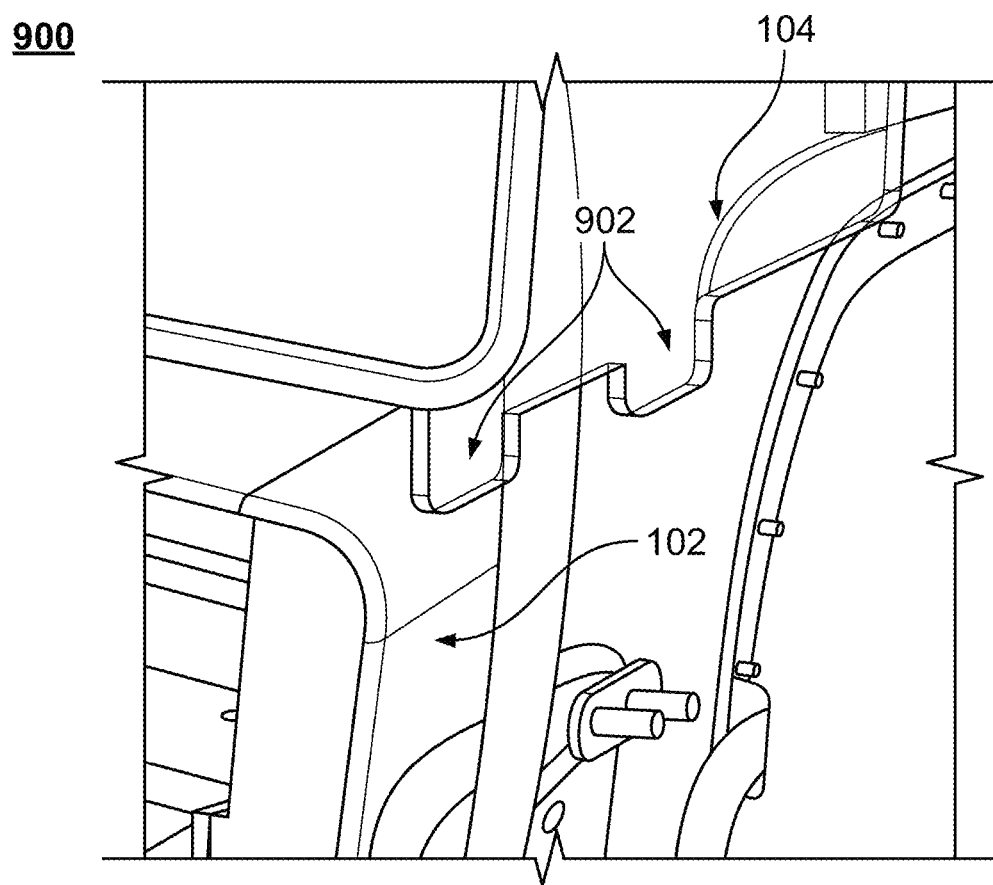
FIG. 9 depicts an exemplary second storage apparatus comprising a plurality of securing tabs arranged within slots of an exemplary storage apparatus, in accordance with some embodiments of the disclosure.

FIG. 9 depicts modular kitchen assembly 900 which includes second storage apparatus 104, comprising securing tabs 902, interfacing with slots of storage apparatus 102, in accordance with some embodiments of the disclosure. The slot of storage apparatus 102 are omitted in FIG. 9 for clarity and are shown in FIG. 14 as slots 1410. Modular kitchen assembly 900 may comprise fewer than the depicted components or fewer than the components described in reference to modular kitchen assembly 900. Additionally, modular kitchen assembly 900 may comprise any or all of the components or features described in reference to or depicted in FIGS. 1-8 and 10-16.

Figure 10:
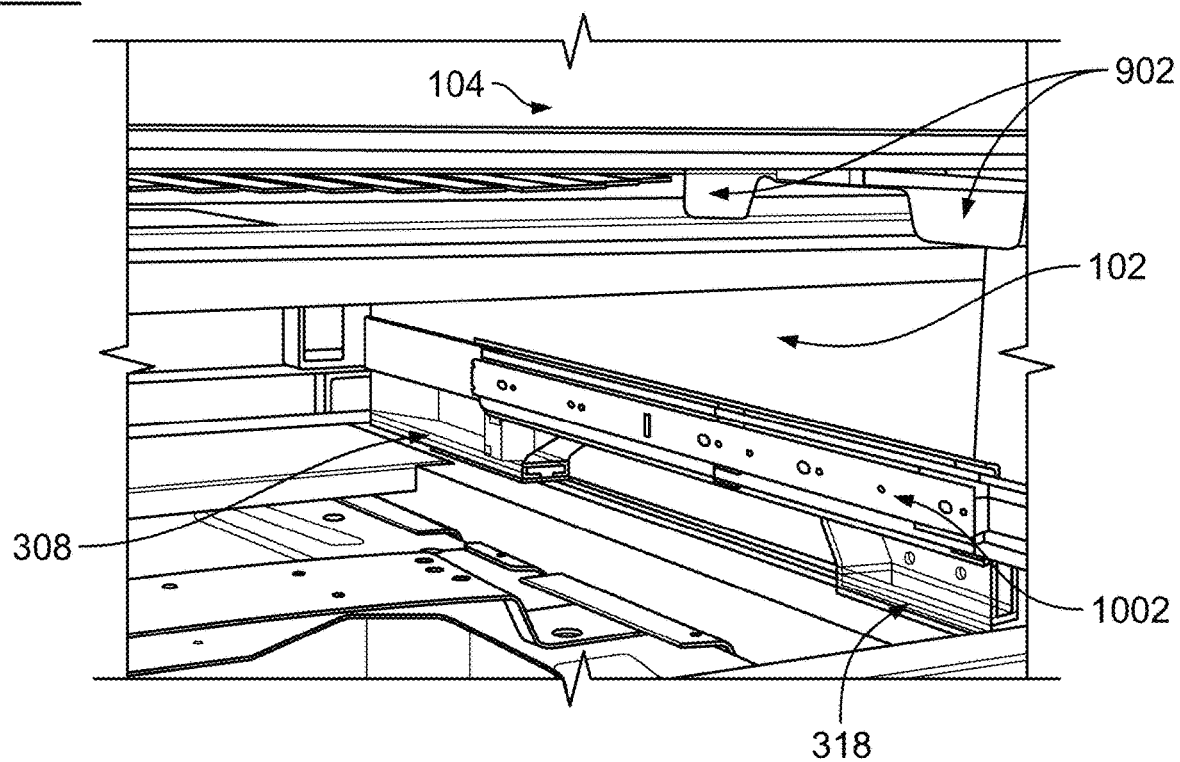
FIG. 10 depicts an exemplary storage apparatus configured to interface with a mounting apparatus, in accordance with some embodiments of the disclosure.

FIG. 10 depicts modular kitchen assembly 1000 comprising storage apparatus 102 configured to interface with rail structures 308 and 318, in accordance with some embodiments of the disclosure. Modular kitchen assembly 1000 may comprise fewer than the depicted components or fewer than the components described in reference to modular kitchen assembly 1000. Additionally, modular kitchen assembly may comprise any or all of the components, or features, described in reference to or depicted in FIGS. 1-9 and 11-16.

Modular kitchen assembly 1000 depicts second storage apparatus 104, comprising securing tabs 902, interfacing with slots of storage apparatus 102 (omitted for clarity and present in FIG. 14 as slots 1410). Additionally, modular kitchen assembly 1000 depicts storage apparatus 102 interfacing with rail structures 308 and 318 to rail fixedly attached to a mounting surface below rail structures 308 and 318. Arranged above rail structures 308 and 318, and below the top surface of storage apparatus 102 is extension track 1002. Extension track 1002 may correspond to the articulation guide assembly for kitchen enclosure 110 of FIG. 1. For example, extension track 1002 may comprise a first portion for extending to a first length, to provide access to kitchen enclosure 110, and may further comprise a second portion for extending to a second length, in order to enable kitchen work surface 114 of FIG. 1 to be unfolded.

Figure 11:
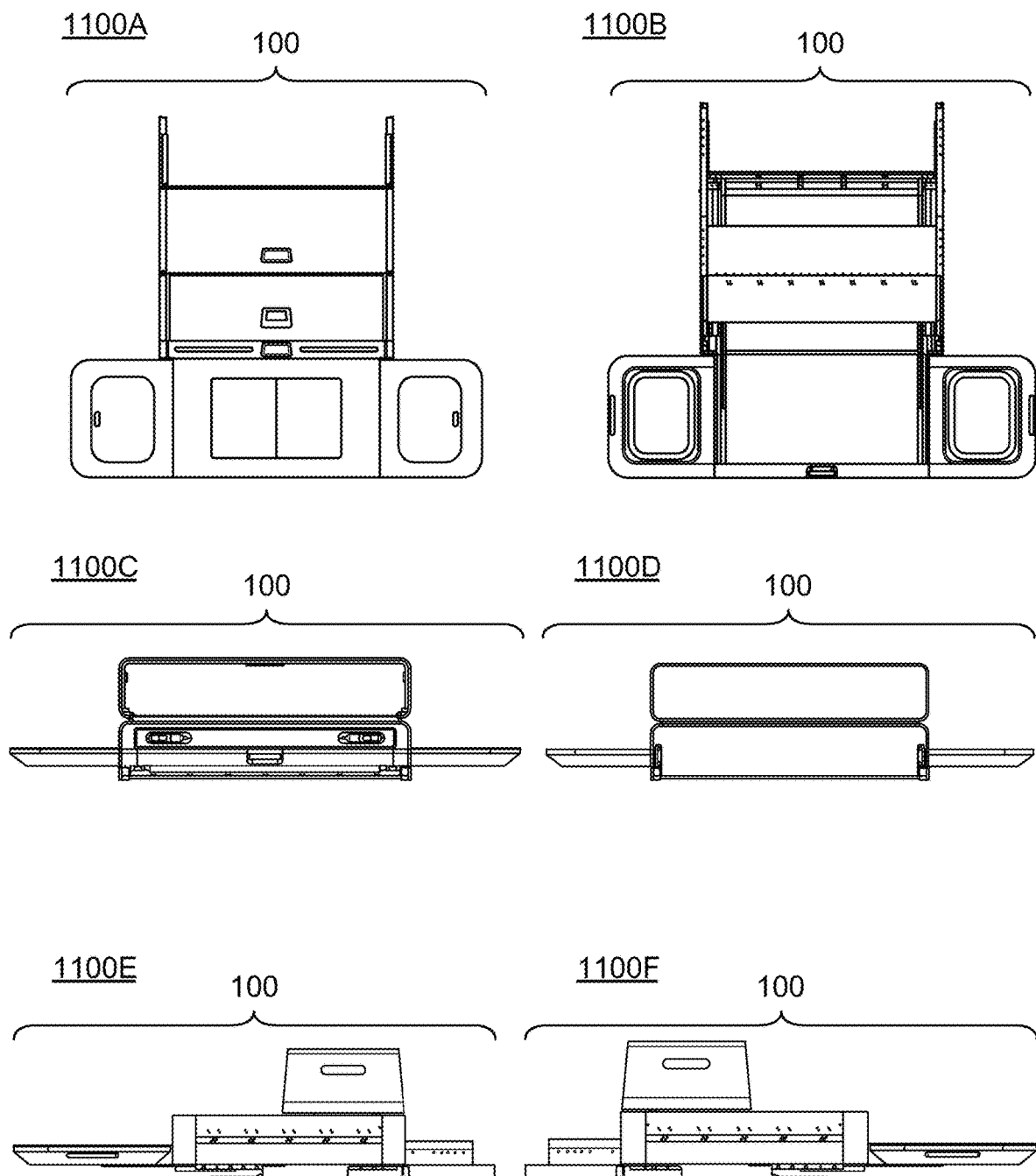
FIG. 11 depicts a plurality of views of an exemplary modular kitchen assembly in an extended position, in accordance with some embodiments of the disclosure.

FIG. 11 depicts top view 1100A, bottom view 1100B, front view 1100C, rear view 1100D, right side view 1100E, and left side view 1100F of modular kitchen assembly 100 of FIG. 1 in a second extended position enabling access to a kitchen work surface, in accordance with some embodiments of the disclosure. Modular kitchen assembly 100 may comprise fewer than the depicted components or fewer than the components described in reference to modular kitchen assembly 100. Additionally, modular kitchen assembly may comprise any or all of the components, or features, described in reference to or depicted in FIGS. 1-10 and 12-15.

Figure 12:
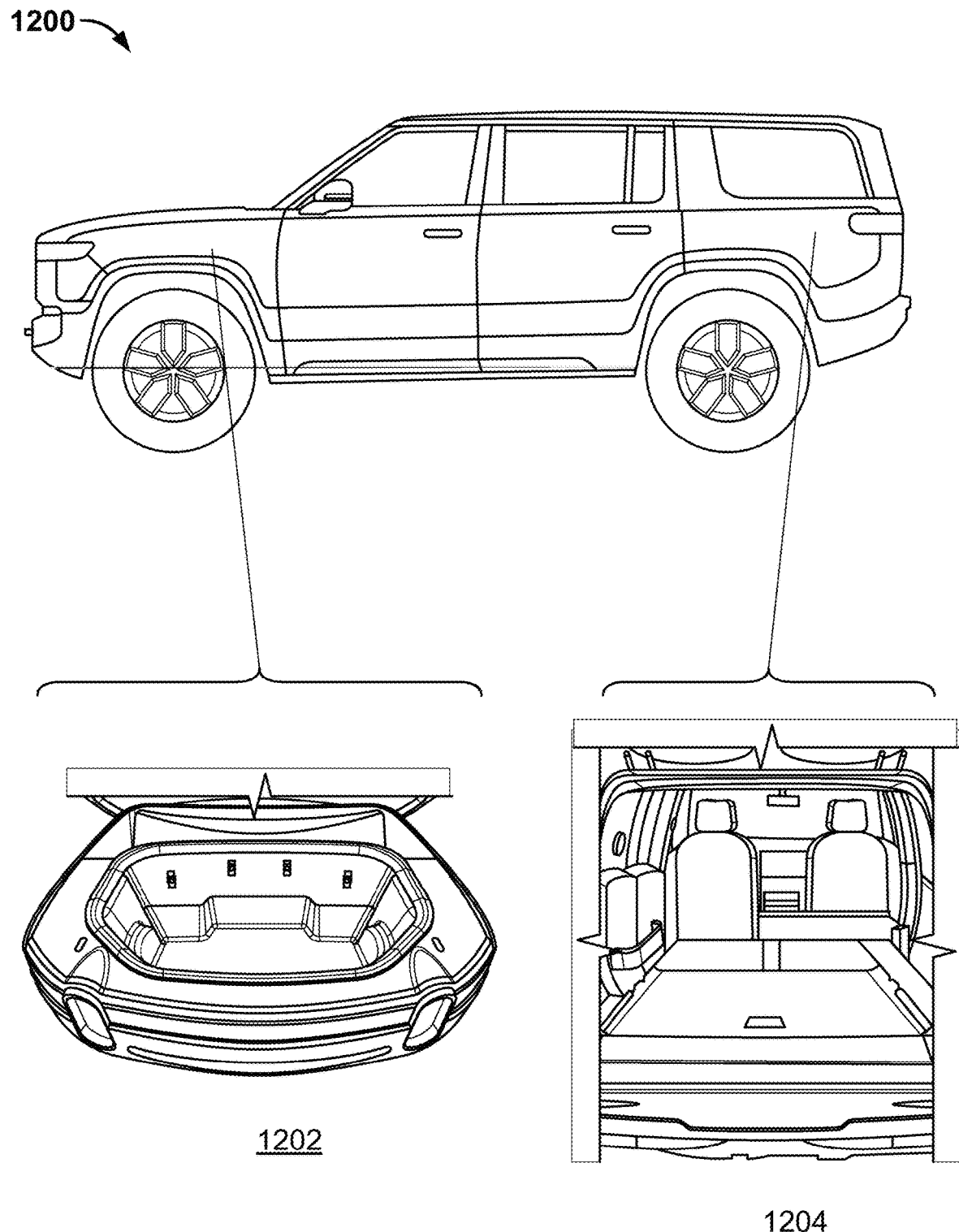
FIG. 12 depicts an exemplary vehicle comprising vehicle bay assemblies configured to accommodate a modular kitchen assembly, in accordance with some embodiments of the disclosure.

FIG. 12 depicts vehicle 1200 comprising front vehicle bay assembly 1202 and rear vehicle bay assembly 1204, both configured to accommodate a modular kitchen assembly, in accordance with some embodiments of the disclosure. Vehicle 1200 may comprise fewer than the depicted components or fewer than the components described in reference to vehicle 1200. Additionally, vehicle 1200 may comprise any or all of the components or features described in reference to or depicted in FIGS. 1-11 and 13-16.

Vehicle 1200 may comprise a powertrain assembly that does not require a power source be installed in either front vehicle bay assembly 1202 or rear vehicle bay assembly 1204. As a result, both front vehicle bay assembly 1202 and rear vehicle bay assembly 1204 may comprise a mounting surface for a modular kitchen assembly (e.g., modular kitchen assembly 100). In some embodiments, the modular kitchen assembly may comprise a mounting apparatus configured for vertical articulation to enable access to the various components of the modular kitchen assembly when it is arranged within front vehicle bay assembly 1202. In some embodiments, the modular kitchen assembly comprises a horizontal articulation configuration to enable the various components of the modular kitchen assembly to be horizontally articulated and extended (e.g., as shown in FIG. 11)

Figure 13:
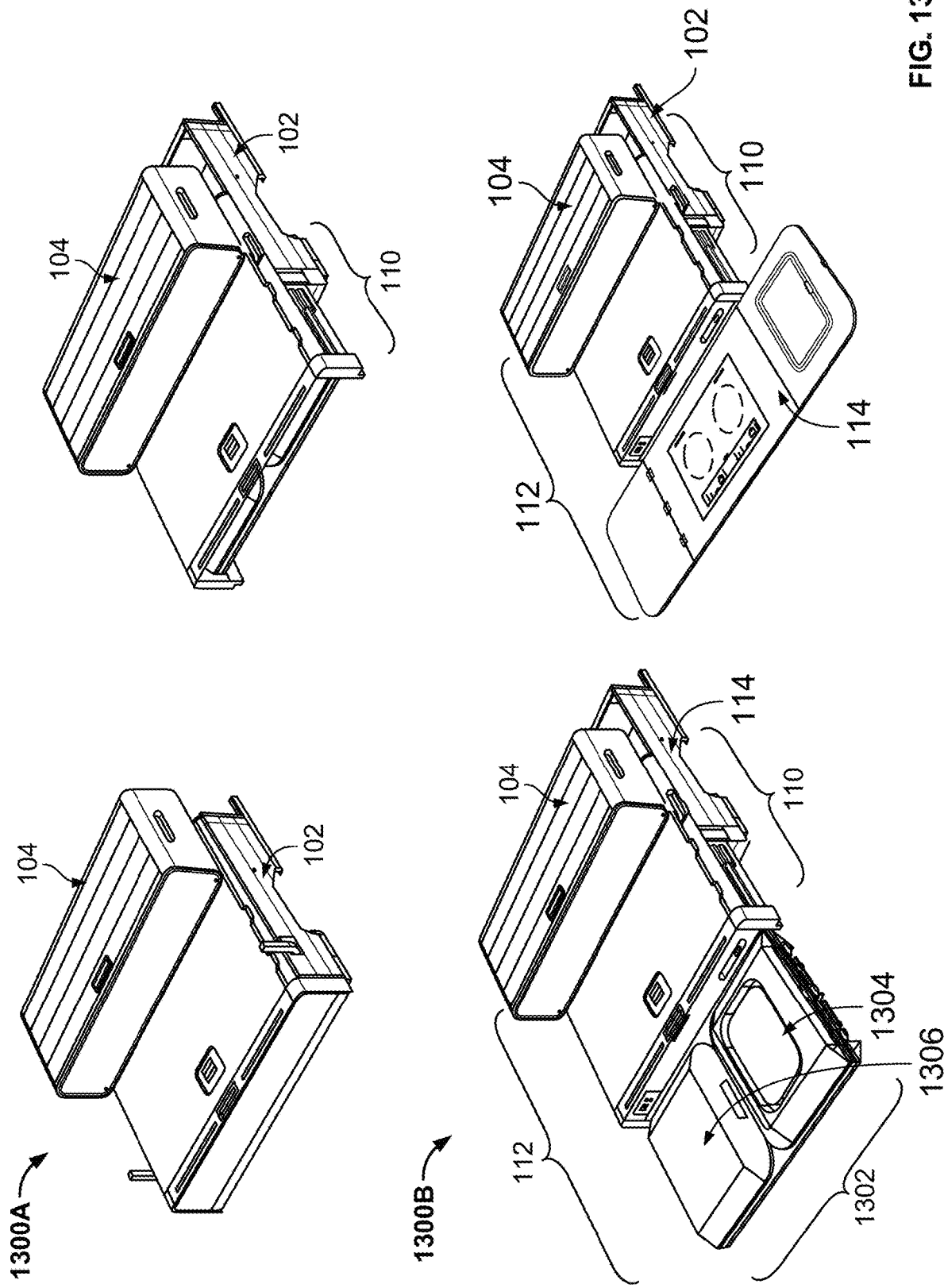
FIG. 13 illustrates examples of a first extended position and a second extended position of a modular kitchen assembly, in accordance with some embodiments of the disclosure.
Figure 14:
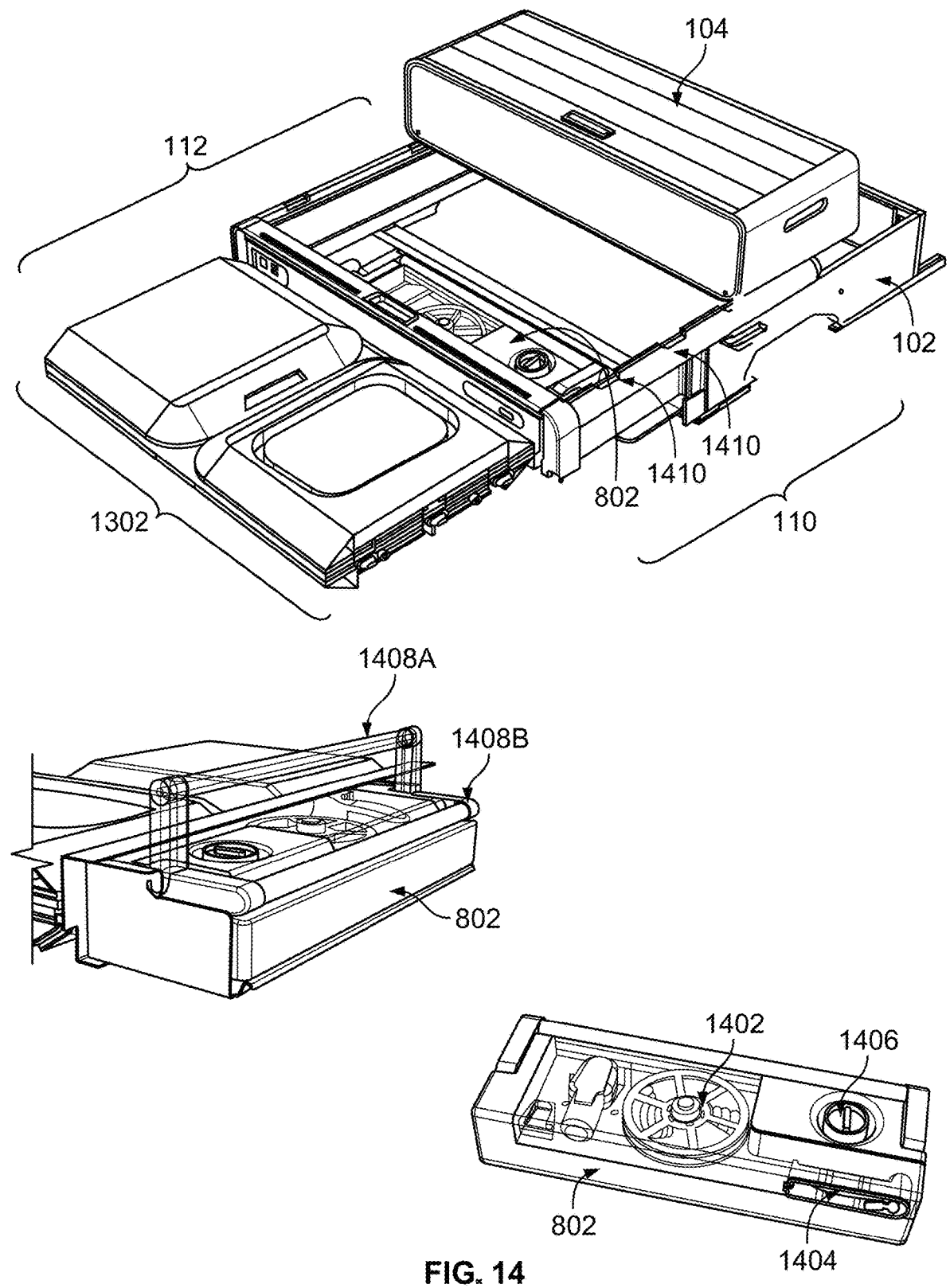
FIG. 14 depicts an exemplary water pump apparatus configured to be arranged within a storage apparatus of a modular kitchen assembly, in accordance with some embodiments of the disclosure.

FIG. 13 depicts enclosure articulation 1300A and extended modular kitchen 1300B, in accordance with some embodiments of the disclosure. Enclosure articulation 1300A and extended modular kitchen 1300B may comprise fewer than the depicted components or fewer than the components described in reference to enclosure articulation 1300A or extended modular kitchen 1300B. Additionally, enclosure articulation 1300A and extended modular kitchen 1300B may comprise any or all of the components or features described in reference to or depicted in FIGS. 1-12 and 14-16.

Enclosure articulation 1300A comprises storage apparatus 102 arranged below second storage apparatus 104. In some embodiments, second storage apparatus 104 is fixedly attached to the top surface of storage apparatus 102 by a plurality of securing tabs. As shown in enclosure articulation 1300A, storage apparatus 102 houses kitchen enclosure 110 which may be accessed when a front side of storage apparatus 102 is opened. Kitchen enclosure 110 may be extended to a first extended position based on a length of guiding tracks arranged within storage apparatus 102 which enable the horizontal articulation of kitchen enclosure 110. Additionally, second storage apparatus 104 is shown as being secured in at least two different positions on top of storage apparatus 102. Second storage apparatus 104 may be slid along a mounting apparatus arranged between storage apparatus 102 and second storage apparatus 104. Alternatively, second storage apparatus 104 may be moved to a different position based on the spacing of a plurality of securing tabs extending from the bottom of second storage apparatus 104 and the spacing of a plurality of slots in the top surface of storage apparatus 102.

Extended modular kitchen 1300B comprises storage apparatus 102 arranged below second storage apparatus 104, wherein kitchen enclosure 110 is in an extended first position while kitchen work surface 114 and folded kitchen work surface 1302 are in an extended second position. Kitchen enclosure 110 extends to a first position out of a front side of storage apparatus 102. When kitchen enclosure 110 is fully extended, retractable kitchen module 112 may be accessed through the front of kitchen enclosure 110. Retractable kitchen module 112 may be extended to a second position such that folded kitchen work surface 1302 may be accessed. Folded kitchen work surface 1302 corresponds to kitchen work surface 114 of FIG. 1. Folded kitchen work surface 1302 comprises folded preparation portion 1306 and collapsible sink 1304. Collapsible sink 1304 may be configured to expand when folded kitchen work surface 1302 is unfolded into kitchen work surface 114. For example, collapsible sink 1304 may comprise an accordion style plurality of walls which fold upon themselves to enable collapsible sink 1304 to be arranged within kitchen enclosure 110 after kitchen work surface 114 is arranged as folded kitchen work surface 1302.

FIG. 14 depicts water pump apparatus 802 from FIG. 8 configured to be arranged within storage apparatus 102 of modular kitchen assembly 100 of FIG. 1, in accordance with some embodiments of the disclosure. Water pump apparatus 802 and modular kitchen assembly 100 may comprise fewer than the depicted components or fewer than the components described in reference to water pump apparatus 802 and modular kitchen assembly 100. Additionally, either modular kitchen assembly 100 or water pump apparatus 802 may comprise any or all of the components or features described in reference to or depicted in FIGS. 1-13, 15, and 16.

As shown in FIG. 8, water pump apparatus 802 is configured to be stored within storage apparatus 102 without inhibiting access to folded kitchen work surface 1302 within kitchen enclosure 110. Kitchen enclosure 110 comprises slots 1410 configured to interface with securing features of second storage apparatus 104 such that second storage apparatus 104 may be arranged on top of storage apparatus 102 at a plurality of fixed positions. In some embodiments, water pump apparatus 802 may be arranged to be stored behind or below folded kitchen work surface 1302 within kitchen enclosure 110. In some embodiment, water pump apparatus 802 may be accessible within kitchen enclosure 110 without needing to remove second storage apparatus 104 from the top of storage apparatus 102. Water pump apparatus 802 comprises a handle which may be articulated from vertical position 1408A to horizontal position 1408B. In some embodiments, the handle may be a portion of a locking assembly to prevent water pump apparatus 802 from moving around within kitchen enclosure 110. For example, if the handle is in vertical position 1408A then water pump apparatus 802 may be removed from kitchen enclosure 100 via the handle. In another example, if the handle in in horizontal position 1408B then water pump apparatus 802 by be locked in place by a locking assembly articulated by the transition of the handle from vertical position 1408A to horizontal position 1408B when placed within kitchen enclosure 110.

Water pump apparatus 802 may further comprises hose retraction assembly 1402, which is configured to retract or wind up a hose associated with water outlet 1404. Water outlet 1404 may be removed form a main body of water pump apparatus 802. Water pump apparatus 802 may further comprise cap 1406 which may be removed to refill a reservoir of water within water pump apparatus 802. When water outlet 1404 is removed, hose retraction assembly 1402 may be released enabling a hose associated with water outlet 1404 to retract when water outlet 1404 is returned to a storage configuration in water pump apparatus 802. In some embodiments, water outlet 1404 can be accessed and used with collapsible sink 1304 without remove water pump apparatus 802. In some embodiments, water pump apparatus 802 may be removed for refilling or cleaning.

Figure 15:
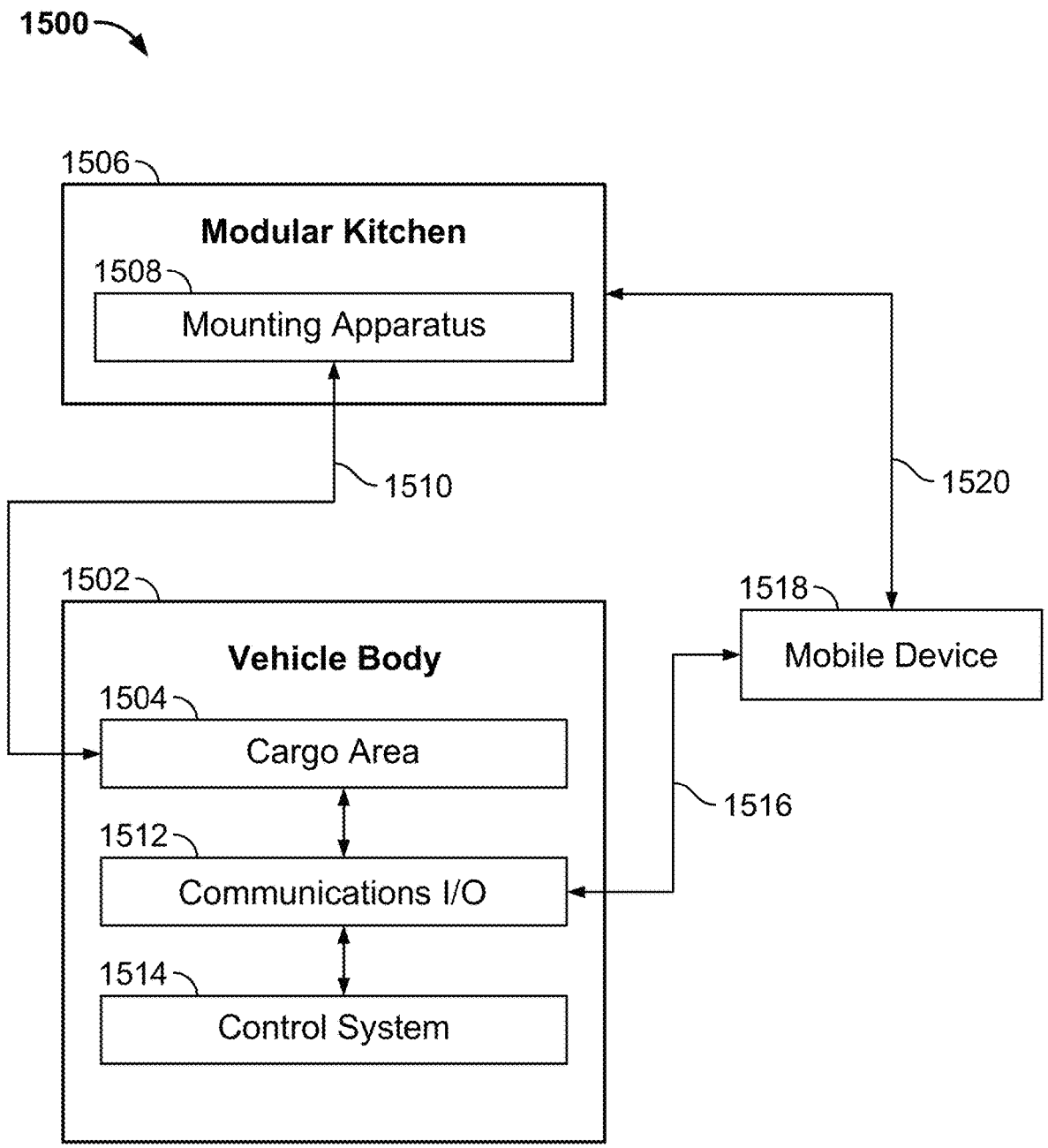
FIG. 15 depicts a block diagram of an exemplary vehicle assembly comprising a modular kitchen assembly configured to be arranged within a vehicle bay assembly, in accordance with some embodiments of the disclosure.

FIG. 15 depicts vehicle assembly 1500 comprising modular kitchen 1506 configured to be arranged within cargo area 1504 of vehicle body 1502, in accordance with some embodiments of the disclosure. Vehicle assembly 1500 may comprise fewer than the depicted components or fewer than the components described in reference to modular kitchen assembly 1500. Additionally, vehicle assembly 1500 may comprise any or all of the components or features described in reference to or depicted in FIGS. 1-14 and 16.

Vehicle body 1502 comprises cargo area 1504. Modular kitchen 1506 interfaces with cargo area 1504 via mounting apparatus 1508. For example, mounting apparatus 1508 may comprise features configured to secure a bottom surface of modular kitchen 1506 to a mounting surface of cargo area 1504. In some embodiments, mounting apparatus 1508 is communicably coupled to cargo area 1504 via communication stream 1510. Communication stream 1510 corresponds to a stream of data exchanged between cargo area 1504 and mounting apparatus 1508 to indicate at least one of a secured status, an articulation status, or reporting motion data of modular kitchen 1506 with respect to cargo area 1504. Cargo area 1504 may interface with communications input/output circuitry 1512, which may comprise a vehicle network configured to transmit and receive data from various devices configured to interface with vehicle body 1502. Communications input/output circuitry 1512 is communicatively coupled to control system 1514 of vehicle body 1502 to enable data from communications input/output circuitry 1512 to be utilized to execute actions or providing accurate status data to a user of vehicle assembly 1500 and/or modular kitchen 1506. In some embodiment, mobile device 1518 may be communicatively coupled to communications input/output circuitry 1512 via communication stream 1516. Communication stream 1516 may comprise any stream of information enabling mobile device 1518 to provide information to vehicle body 1502 or receive information from vehicle body 1502. For example, communication stream 1516 may be configured to report to mobile device 1518 a secured status of modular kitchen 1506 while mobile device 1518 may utilized communication stream 1516 to transmit an unlock instruction for modular kitchen 1506. Additionally, mobile device 1518 may communicate directly with modular kitchen 1506 via communication stream 1520 to either provide a configuration instruction or receive a status update for modular kitchen 1506.

Figure 16:
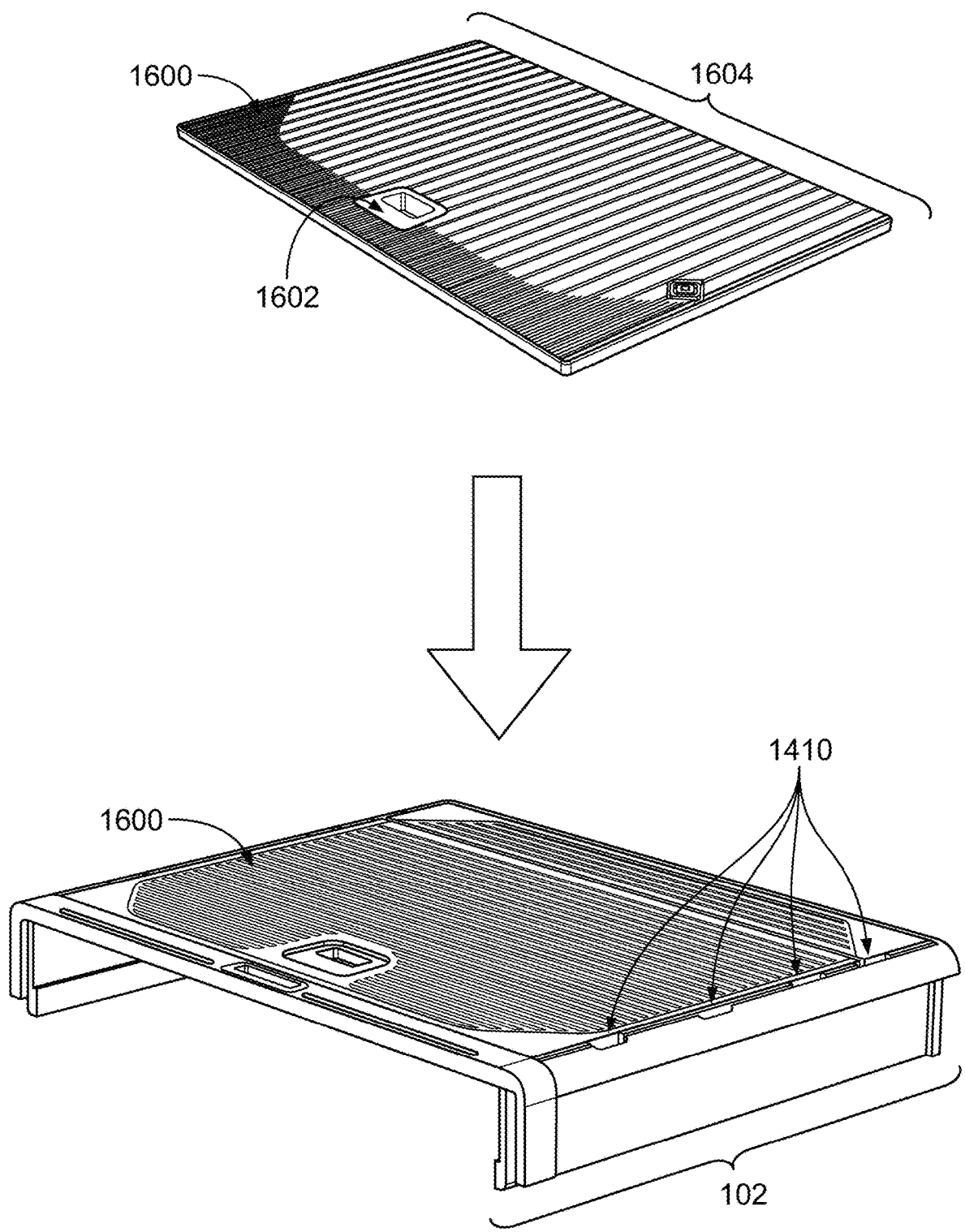
FIG. 16 depicts an exemplary mounting surface panel configured to interface with an exemplary storage apparatus, in accordance with some embodiments of the disclosure.

FIG. 16 depicts mounting surface panel 1600 configured to interface with storage apparatus 102, in accordance with some embodiments of the disclosure. Mounting surface panel 1600 may comprise fewer than the depicted components or fewer than the components described in reference to mounting surface panel 1600. Additionally, mounting surface panel 1600 may interface with any or all of the components or features described in reference to or depicted in FIGS. 1-15.

Mounting surface panel 1600 comprises latch 1602 and ribs 1604. Latch 1602 corresponds to an assembly configured to release mounting surface panel 1600 from a secured configuration and secure mounting surface panel 1600 in an installed position when aligned with an opening configured to accommodate mounting surface panel 1600. In some embodiments, latch 1602 may comprise an extension which is configured to extend and retract along an axis corresponding to an actuation axis of latch 1602. The extension may be configured to engage and disengage a slot to secure mounting surface panel 1600 in a position accommodated by a mounting structure comprising the slot. In some embodiments, latch 1602 receives an extension from a latching apparatus and latch 1602 is configured to engage and disengage with the extension. Ribs 1604 are structured to provide additional stiffness to the mounting surface panel 1600. In some embodiments, ribs 1604 are structured based on a height profile and a width profile configured to increase the bending strength of mounting surface panel 1600 over a threshold bending strength. For example, ribs 1604 may be formed such that when one end of mounting surface panel 1600 is secured and the other end of mounting surface panel 1600 is hanging over an edge, mounting surface panel 1600 is configured to withstand the weight of an adult person without plastically or elastically deforming. Mounting surface panel 1600 is configured to interface with an opening or top surface of storage apparatus 102 of FIG. 1. Storage apparatus 102 includes slots 1410 of FIG. 14, which are configured to receive tabs of a second storage apparatus (e.g., second storage apparatus 104 of FIG. 1). In some embodiments, mounting surface panel 1600 is an original equipment vehicle panel that is used in the storage area to cover a spare wheel well. When storage apparatus 102 is installed in the storage area, mounting surface panel 1600 can be removed from a storage area (e.g., vehicle bay assembly 700A or 700B) and installed on storage apparatus 102. In some embodiments, when mounting surface panel 1600 is removed from storage apparatus 102 and kitchen enclosure 106 is extended out from storage apparatus 102, a user can gain access to the spare wheel well without having to remove storage apparatus 102 from the storage area.

The systems and processes discussed above are intended to be illustrative and not limiting. One skilled in the art would appreciate that the actions of the processes discussed herein may be omitted, modified, combined, and/or rearranged, and any additional actions may be performed without departing from the scope of the invention. More generally, the above disclosure is meant to be exemplary and not limiting. Only the claims that follow are meant to set bounds as to what the present disclosure includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

While some portions of this disclosure may refer to examples or embodiments, any such reference is merely to provide context to the instant disclosure and does not form any admission as to what constitutes the state of the art.

What is claimed is:

1. A mounting apparatus comprising:
    a release assembly arranged in a first slot, wherein the first slot comprises a conical pocket configured to receive the release assembly; and
    a locking assembly comprising a handle, wherein the locking assembly is configured to engage with a second slot, and wherein the locking assembly is configured to actuate into a locking position in response to rotation of the handle such that the locking position prevents translation of a storage apparatus along the second slot.

2. The mounting apparatus of claim 1, wherein:
    the first slot is affixed to a mounting surface and the second slot is affixed to the mounting surface; and
    the storage apparatus is coupled to the locking assembly.

3. The mounting apparatus of claim 1, wherein the release assembly is configured to disengage from the conical pocket in response to a motion event.

4. The mounting apparatus of claim 1, wherein the storage apparatus is arranged such that when the release assembly disengages from the conical pocket, a first end of the storage apparatus vertically translates while a second end of the storage apparatus remains fixedly attached to the second slot.

5. The mounting apparatus of claim 1, wherein the second slot comprises a t-slot.

6. The mounting apparatus of claim 1, wherein the second slot comprises a geometry configured to accommodate a guiding protrusion of the storage apparatus.

7. The mounting apparatus of claim 1, wherein when the storage apparatus is aligned at a first position relative to the mounting apparatus, the storage apparatus can be translated in a first direction to separate the storage apparatus from the mounting apparatus and in a second perpendicular direction to cause a guiding protrusion to engage a geometry of the second slot.

8. The mounting apparatus of claim 1, further comprising:
    a first rail structure that comprises the first slot and the second slot; and
    a second rail structure that comprises a third slot and a fourth slot, wherein the first rail structure and the second rail structure are each fixedly attached to a mounting surface.

9. The mounting apparatus of claim 1, further comprising a third slot, wherein the third slot comprises a respective conical pocket.

10. The mounting apparatus of claim 1, wherein:
    the storage apparatus is configured to translate along the second slot in response to the handle being arranged perpendicular to a mounting surface configured to accommodate the second slot; and
    the storage apparatus is configured to remain stationary relative to the second slot in response to the handle being arranged parallel to the mounting surface in the locking position.

11. The mounting apparatus of claim 1, further comprising a fourth slot, wherein the fourth slot comprises a t-slot.

12. The mounting apparatus of claim 1, wherein each of the second slot and a fourth slot comprises a respective t-slot configured to accommodate a respective guiding protrusion of the storage apparatus.

13. A vehicle bay assembly comprising:
    a storage apparatus comprising:
        first and second release assemblies; and
        first and second locking assemblies; and a mounting apparatus fixedly attached to a mounting surface and configured to interface with the storage apparatus, wherein the mounting apparatus comprises:
first and second conical pockets arranged within respective first and second slots, wherein:
the first and second release assemblies are configured to disengage the first and second conical pockets, respectively, in response to a motion event; and
the first and second locking assemblies are configured to engage with third and fourth slots, respectively, to prevent translation of the storage apparatus along the third and fourth slots.

14. The vehicle bay assembly of claim 13, wherein the storage apparatus is configured to be coupled to each of the first slot and the third slot when the storage apparatus is translated into an installation position along the mounting apparatus.

15. The vehicle bay assembly of claim 13, wherein:
the first release assembly extends from a first alignment protrusion, wherein the first alignment protrusion extends from a bottom surface of the storage apparatus; and
the second release assembly extends from a second alignment protrusion, wherein the second alignment protrusion extends from a bottom surface of the storage apparatus.

16. The vehicle bay assembly of claim 13, wherein the storage apparatus is arranged such that when each respective release assembly disengages from each respective conical pocket, a first portion of the storage apparatus vertically translates away from the mounting surface while a second portion of the storage apparatus remains fixedly attached to the mounting apparatus.

17. The vehicle bay assembly of claim 13, wherein the storage apparatus comprises a frame configured to accommodate a pair of guidance tracks for translating a storage feature between a first locked position, a second position corresponding to a first extended length, and a third position corresponding to a second extended length that is longer than the first extended length.

18. The vehicle bay assembly of claim 13, wherein a portion of the mounting surface is configured to be fixedly attached to a top surface of the storage apparatus.

19. A vehicle, comprising:
a storage apparatus comprising:
a pair of alignment protrusions, each comprising a respective release assembly; and
a pair of guiding protrusions; and
a mounting apparatus coupled to a vehicle surface and configured to interface with the storage apparatus, the mounting apparatus comprising:
a first pair of slots, wherein each of the first pair of slots is configured to receive one of the pair of alignment protrusions and accommodate one of the respective release assemblies; and
a second pair of slots, wherein:
each of the second pair of slots is configured to receive a respective locking assembly of the pair of guiding protrusions; and
each locking assembly is configured to engage with each of the second pair of slots, respectively, to prevent translation of the storage apparatus along each of the second pair of slots in response to rotation of a handle coupled to at least one locking assembly.

20. The vehicle of claim 19, wherein:
the mounting apparatus is coupled to a bottom surface of a storage apparatus, wherein the storage apparatus comprises a second surface arranged opposite of the bottom surface; and
the vehicle comprises a second storage apparatus that is releasably engaged with the second surface of the storage apparatus.

* * * * *